(12) United States Patent
Borella

(10) Patent No.: US 7,346,684 B2
(45) Date of Patent: Mar. 18, 2008

(54) SYSTEM AND METHOD FOR CONTROL OF PACKET DATA SERVING NODE SELECTION IN A MOBILE INTERNET PROTOCOL NETWORK

(75) Inventor: Michael S. Borella, Naperville, IL (US)

(73) Assignee: Utstarcom, Inc., Alameda, CA (US)

( * ) Notice: Subject to any disclaimer, the term of this patent is extended or adjusted under 35 U.S.C. 154(b) by 0 days.

(21) Appl. No.: 10/355,468

(22) Filed: Jan. 31, 2003

(65) Prior Publication Data

US 2004/0153525 A1   Aug. 5, 2004

(51) Int. Cl.
*G06F 15/173* (2006.01)
*H04Q 7/20* (2006.01)

(52) U.S. Cl. .................. 709/225; 455/433; 455/434; 455/437; 370/310; 370/328

(58) Field of Classification Search .............. 718/105; 455/517, 509, 446, 436, 410, 433, 422.1, 455/432, 419, 550.1, 556.2, 403, 440, 411, 455/434, 437, 418, 425, 461; 370/338, 401, 370/310, 328, 912

See application file for complete search history.

(56) References Cited

U.S. PATENT DOCUMENTS

| | | | |
|---|---|---|---|
| 6,834,050 B1 * | 12/2004 | Madour et al. | 370/392 |
| 2003/0021252 A1 * | 1/2003 | Harper et al. | 370/338 |
| 2003/0119519 A1 * | 6/2003 | Madour et al. | 455/453 |
| 2003/0123395 A1 * | 7/2003 | Jeon | 370/252 |
| 2004/0081118 A1 * | 4/2004 | Mukherjee et al. | 370/328 |
| 2005/0181773 A1 * | 8/2005 | Chang | 455/414.1 |

* cited by examiner

*Primary Examiner*—Nathan Flynn
*Assistant Examiner*—Ashok Patel

(57) ABSTRACT

A system and methods are shown for selecting a packet data serving node (PDSN) for a mobile node in an Internet Protocol network. A network node receives a message associated with a mobile node. The message includes a service request parameter corresponding to a requested service. The network node uses the service request parameter to select the address of a packet data serving node (PDSN) offering the service. The network node then sends a response message directing a connection with the selected PDSN. The service request parameter may be an international mobile subscriber identifier (IMSI) that identifies a subscriber requesting a static IP address, in which case the network node directs a connection with a PDSN that offers an. Internet connection with the static IP address.

9 Claims, 18 Drawing Sheets

FIGURE 5

| | |
|---|---|
| IP HEADER 502 | |
| UDP HEADER 504 | |
| TYPE 506 | RESERVED 508 | LENGTH 510 |
| HEARTBEAT INTERVAL 512 | RESERVED 514 |
| FOREIGN AGENT ADDRESS 516 | |
| SUBTYPE CALL LOAD 518 | LENGTH 520 | FOREIGN AGENT CALL LOAD 522 |
| SUBTYPE CPU USAGE 524 | LENGTH 526 | FOREIGN AGENT CPU USAGE 528 |
| SUBTYPE MEMORY USAGE 530 | LENGTH 532 | FOREIGN AGENT MEMORY USAGE 534 |
| FH AUTH TYPE 536 | LENGTH 538 | SPI 540 |
| SPI 542 | AUTHENTICATOR... 544 |
| AUTHENTICATOR... | |

| | | |
|---|---|---|
| IP HEADER 602 | | |
| UDP HEADER 604 | | |
| TYPE 606 | RESERVED 608 | LENGTH 610 |
| PDSN ADDRESS 612 | | |
| | RESERVED 616 | SPI 622 |
| KEY TAG VALUE 614 | | SECRET 624 |
| SUBTYPE PDSN-RNN KEY 618 | LENGTH 620 | |
| SPI | | |
| ...SECRET (CONTINUED) | | |
| ...SECRET (CONTINUED) | | |
| ...SECRET (CONTINUED) | | |
| SECRET 624 | SUBTYPE PDSN-AAA KEY 626 | LENGTH 628 |
| FAAA IP ADDRESS 630 | | |
| ...SECRET (CONTINUED) | | |
| ...SECRET (CONTINUED) | | |
| ...SECRET (CONTINUED) | | |
| ...SECRET | | |
| FH AUTH TYPE 634 | LENGTH 636 | SPI 638 |
| SPI | AUTHENTICATOR ... 640 | |

600

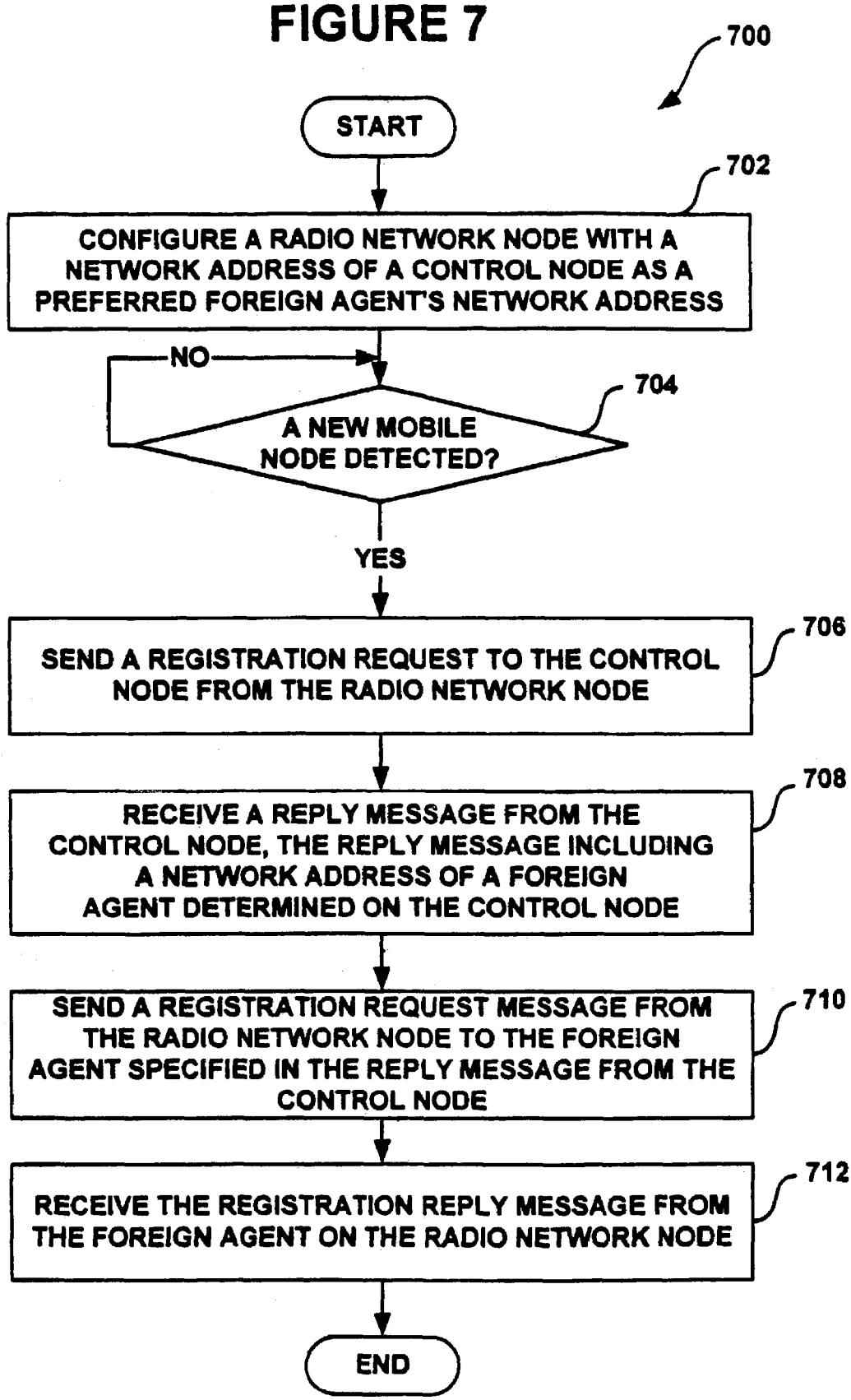

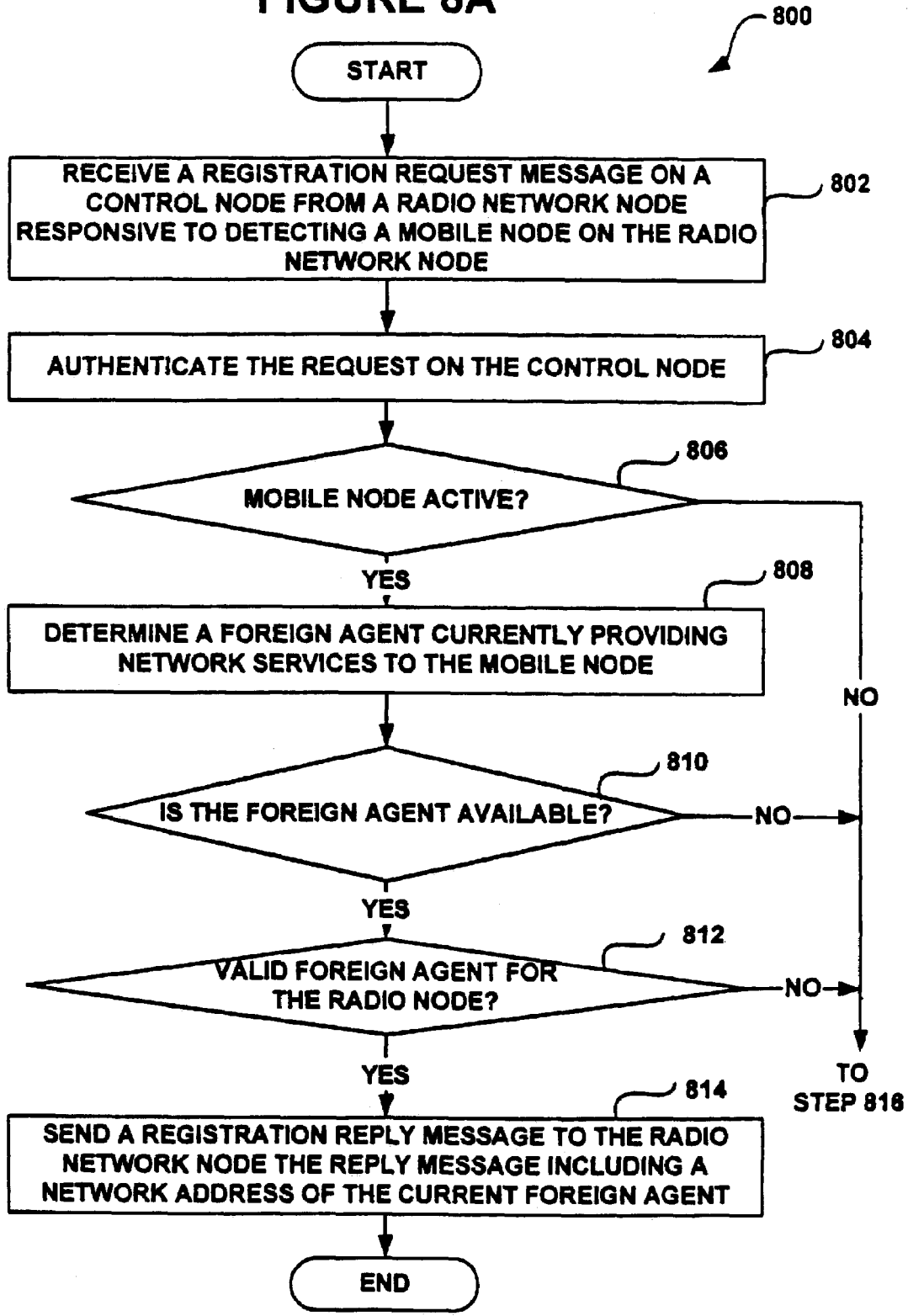

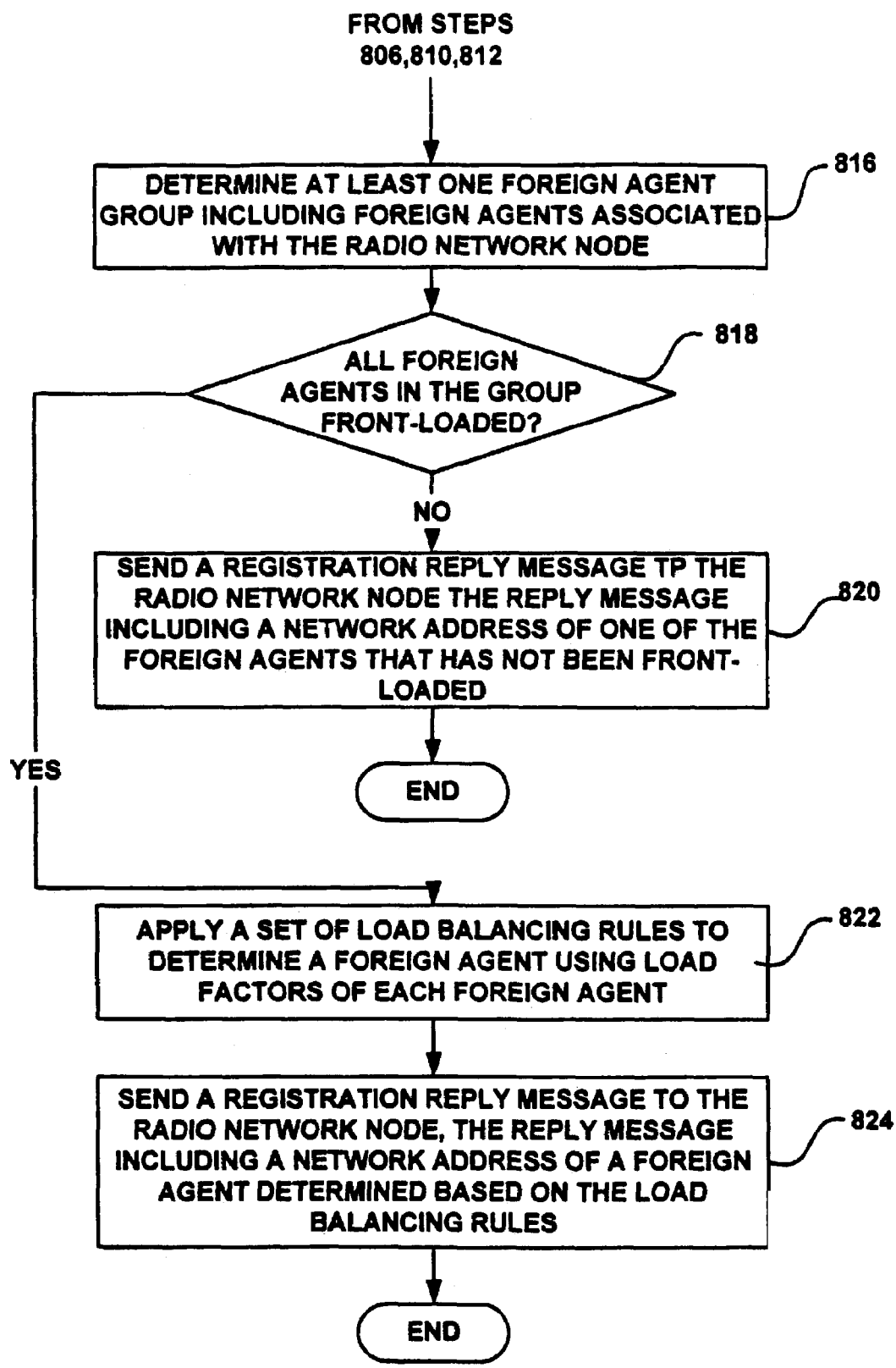

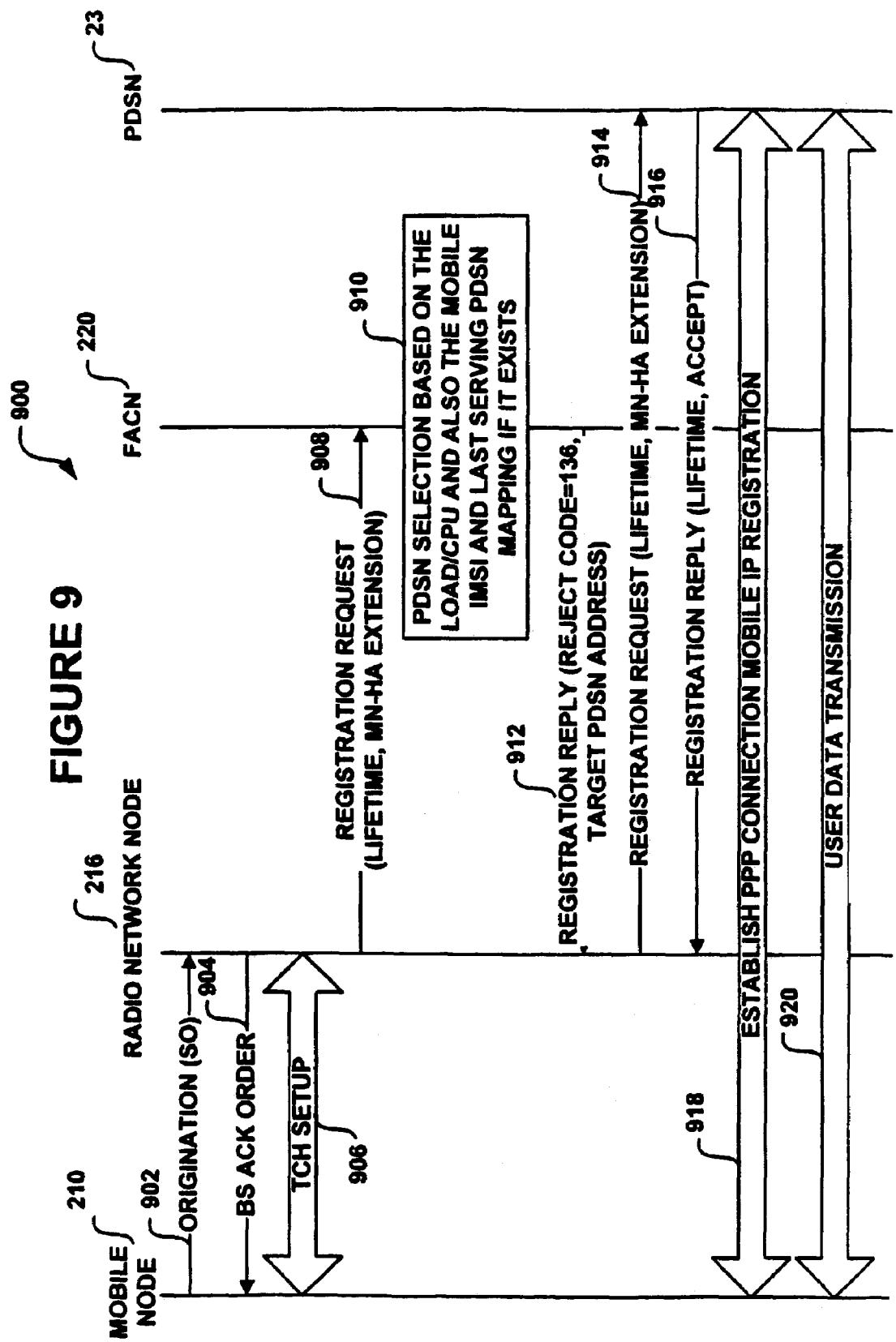

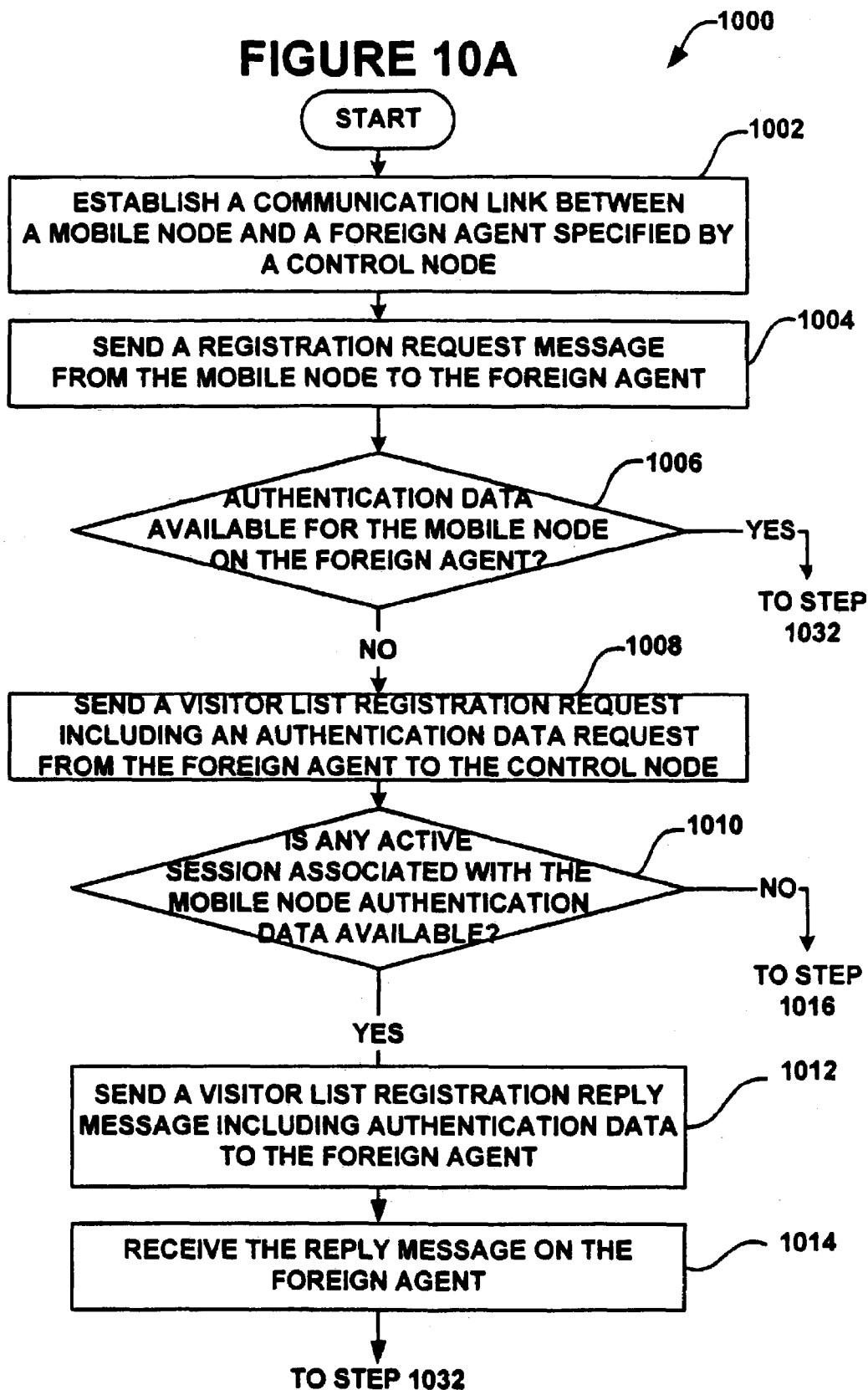

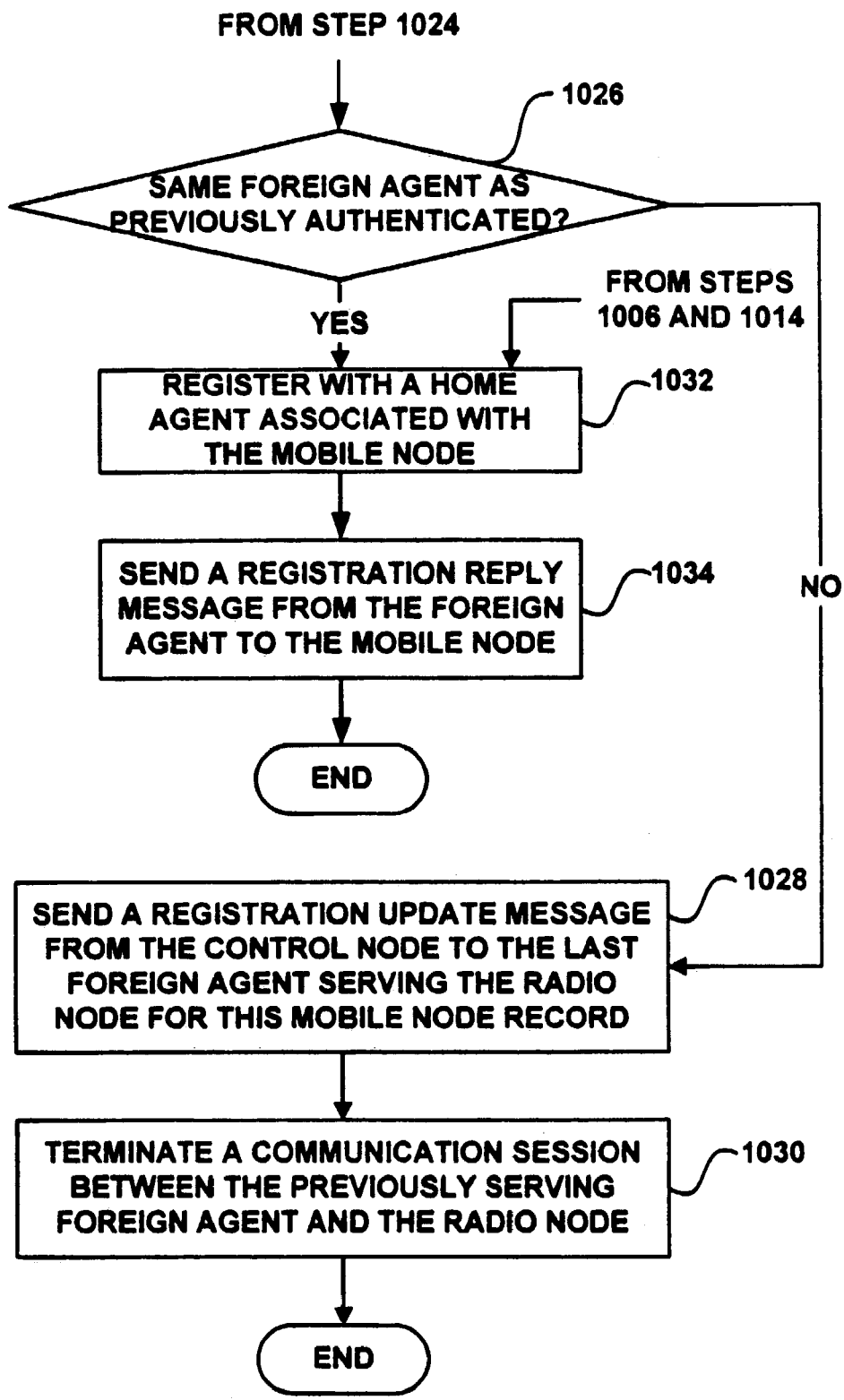

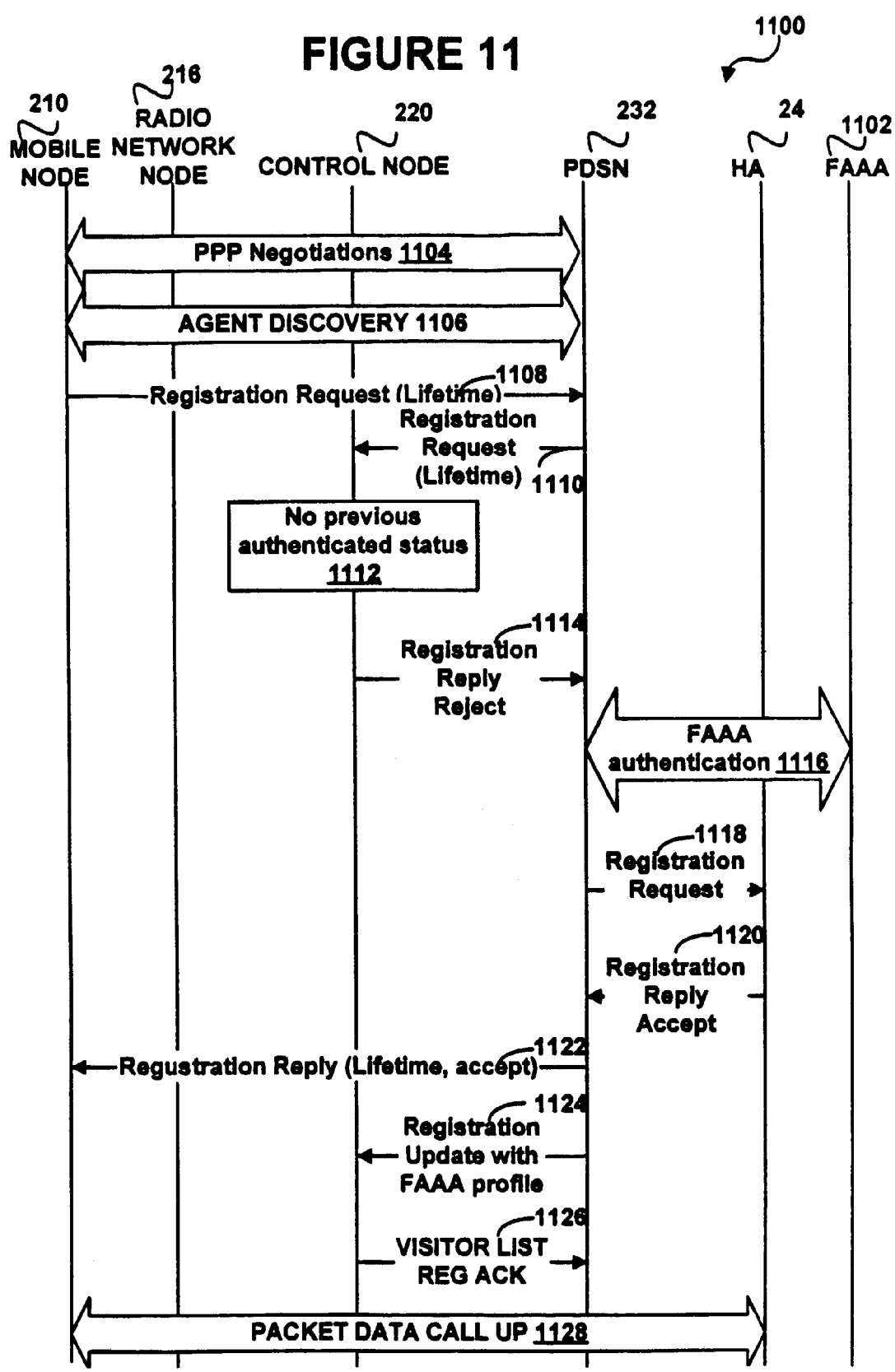

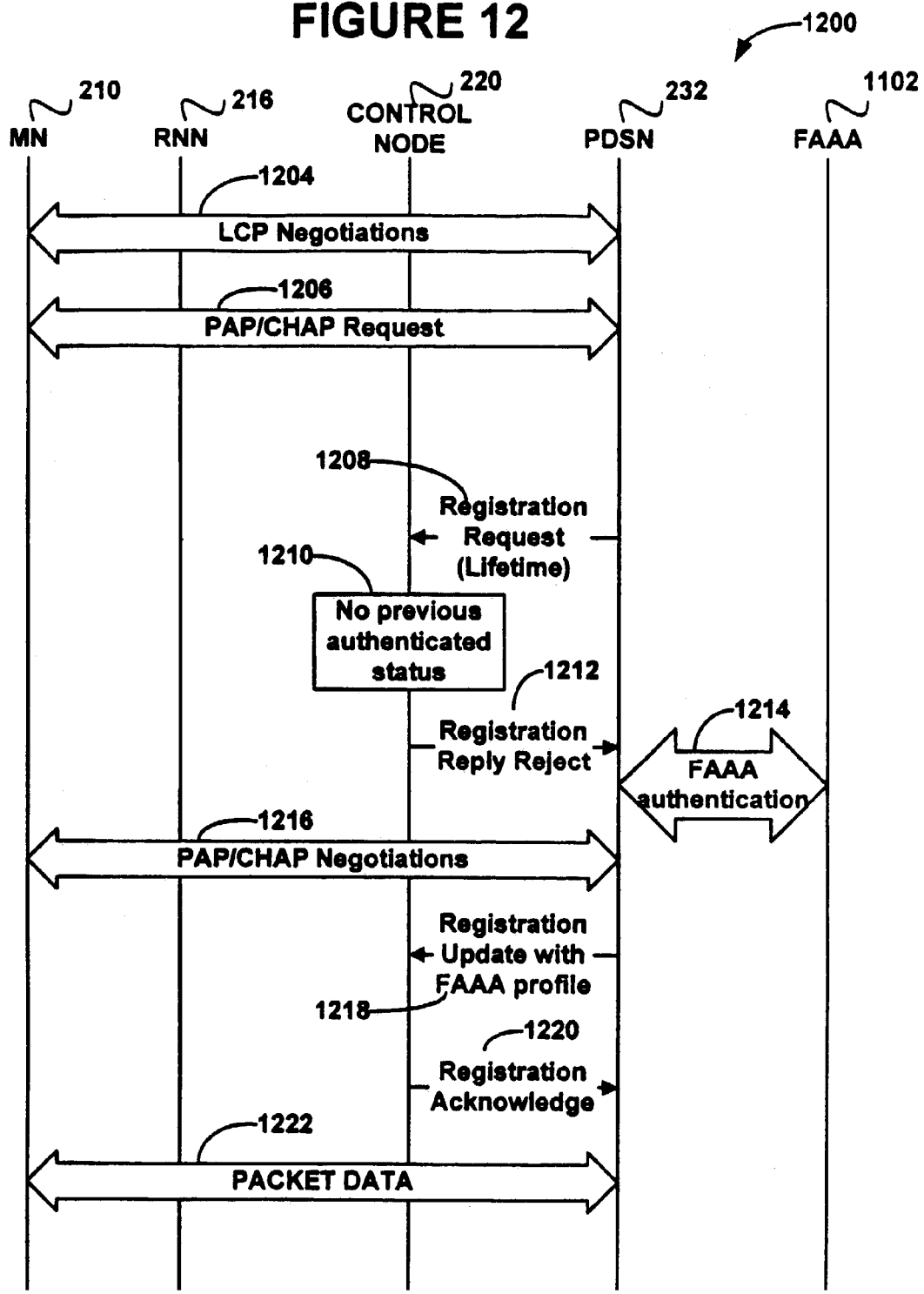

At FACN:
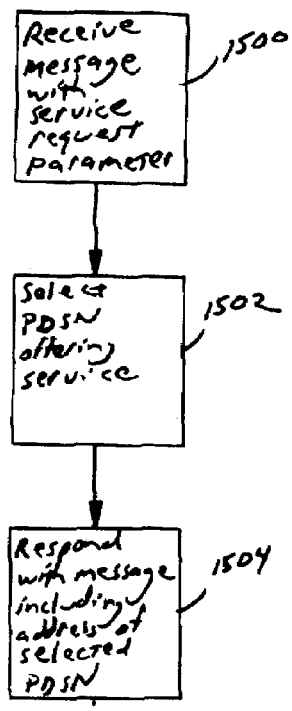
At PCF:
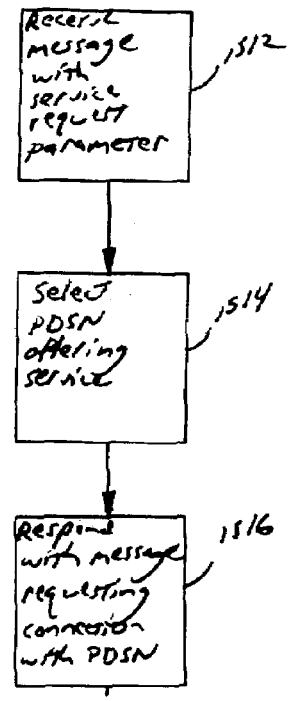
At PDSN:
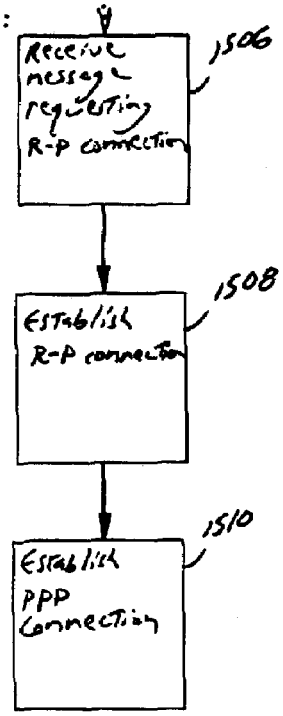
Fig 15a
At PDSN:
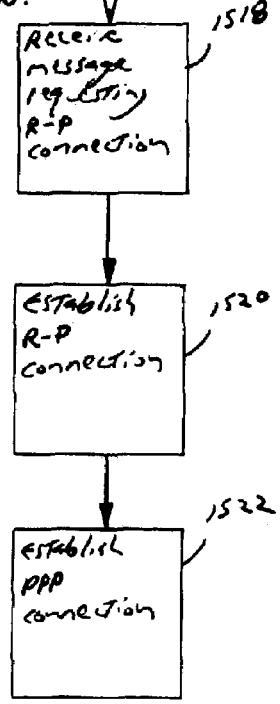
Fig 15b

SYSTEM AND METHOD FOR CONTROL OF PACKET DATA SERVING NODE SELECTION IN A MOBILE INTERNET PROTOCOL NETWORK

FIELD OF THE INVENTION

The present invention relates to communications in mobile Internet Protocol ("IP") networks. More particularly, it relates to the selection of packet data serving nodes in mobile IP networks.

BACKGROUND OF THE INVENTION

The Internet Protocol ("IP") is an addressing protocol designed to route traffic within a network or between networks. The Internet Protocol is used on many computer networks including the Internet, intranets and other networks. Internet Protocol addresses are typically assigned to "immobile" nodes on a network. An immobile node may be moved to a different computer network, but is typically associated with a static physical location (e.g., 3Com Corporation in Santa Clara, Calif.) and an immobile Internet protocol address.

The Mobile Internet Protocol (hereinafter Mobile IP) allows "mobile" nodes to transparently move between different Internet Protocol sub-networks ("subnets"). Internet Protocol addresses are typically assigned to mobile nodes based on their home Internet Protocol subnet. The home subnet is connected to an external network (e.g., the Internet or an intranet) with a "home agent" that serves as the subnet's gateway router. As is known in the art, the gateway connects computer networks using different networking protocols or operating at different transmission capacities. As is known in the art, a router translates differences between network protocols and routes data packets to an appropriate network node or network device.

When a mobile node "roams" (i.e., dynamically changes its physical location), it periodically transmits "agent solicitation" messages to other gateway routers. A mobile node also listens for "agent advertisement" messages from other gateway routers. When a mobile node receives an agent advertisement message indicating that it is now on a foreign subnet, it registers with the foreign gateway router or "foreign agent" and its home agent. The registration with the home agent indicates that the mobile node is away from "home" (i.e., away from its home subnet). The registration with the foreign agent allows the mobile node to receive data on the foreign subnet.

The Mobile Internet Protocol allows a mobile node to dynamically change its network connectivity in a manner that is transparent to protocol layers above the Internet Protocol layer, for example, without re-establishing Transmission Control Protocol ("TCP") or User Datagram Protocol ("UDP") sessions. As is known in the art, Transmission Control Protocol and User Datagram Protocol are often used over Internet Protocol in computer networks. Transmission Control Protocol provides a connection-oriented, end-to-end reliable protocol designed to fit into a layer hierarchy of protocols that support multi-network applications. User Datagram Protocol provides a transaction oriented datagram protocol, where delivery and duplicate packet protection are not guaranteed.

It is often desirable to establish a voice, video and/or data call from a mobile node that has roamed from its home network to a foreign network. Such a voice, video or data call is typically established using call control and other protocols such as Session Initiation Protocol ("SIP"), H.323, Authentication, Authorization and Accounting ("AAA"), e.g., for billing, Domain Name System ("DNS"), e.g., for IP address decoding, etc.

A mobile node registers with its home agent using a Mobile IP Registration Request message. As a result, its home agent can create or modify a mobility binding record for that mobile node. A mobility binding record is used to keep track of mobile communications information such as a home network address of a mobile node on a home network, a care-of-address for the mobile node on a foreign network, a lifetime timer for the association between the home network address and the care-of-network address, and other types of mobile communication information.

Mobile Internet Protocol requires link layer connectivity between a mobile node and a foreign agent. However, in some systems, the link layer from the mobile node may terminate at a point distant from a foreign agent. Such networks are commonly referred to as third generation ("3G") networks. Third-generation networks support data rates ranging from 144K bits-per-second to 2M bits-per-second, packet switched services including IP traffic, multimedia services including video conferencing and streaming video, or international roaming among different third generation operating environments. Third generation networks include packet-based transmission of digitalized voice, data and video, and encompass a range of wireless technologies including Code Division Multiple Access ("CDMA"), Universal Mobile Telecommunications Service ("UMTS"), Wide-band CDMA ("WCDMA") and others.

As is known in the art, CDMA is a digital communications technology that uses spread-spectrum communication techniques. CDMA does not assign a specific frequency to each user Instead, every CDMA communication channel can use the full available communications spectrum, and individual conversations are encoded with a pseudo-random digital sequence.

UMTS is a third generation technology that delivers broadband information at speeds up to 2M bps. Besides voice and data, UMTS delivers audio and video to wireless devices anywhere in the world through fixed, wireless and satellite systems.

WCDMA is an International Telecommunications Unit ("ITU") standard derived from the code division multiple access and offers high data speeds to mobile devices. WCDMA supports mobile/portable voice, images, data, and video communications at up to 2M bps. The input signals are digitalized and transmitted in coded, spread-spectrum mode over a broad range of frequencies using a 5 MHz-wide carrier compared with 200 kHz-wide carrier that is used for narrowband CDMA.

FIG. 1 is a block diagram illustrating a network architecture that may be used in a third generation wireless network. Referring to FIG. 1, a mobile node communicates with a target host 34 on an IP network 30 by means of three devices, a radio network node 16, a packet data serving node 18 (i.e., a foreign agent), and a home agent node 24. The physical layer of the mobile node 10 terminates on the radio network node 16, and the foreign agent's functionality resides on the packet data serving node 18. The radio network node 16 may relay link layer protocol data between the mobile node 10 and the packet data serving node 18, and the packet data serving node 18 establishes, maintains and terminates the link layer to the mobile node 10. For example, the mobile node 10 may be linked to the radio network node 16 via a communication link on a radio access network.

The packet data serving node 18 provides routing services for the mobile node 10 while it is registered with the home agent 24. The packet data serving node 18 de-tunnels and delivers datagrams that were tunneled from the home agent node 24 via an IP network 20 to the mobile node 10. The communication traffic exchanged between the packet data serving node 16 and the home agent 24 includes data traffic as well as control traffic. The control traffic includes registration request and registration reply messages, for instance. The control traffic terminates at the home agent 24 and the packet data serving node 16, while the data traffic is routed between the mobile, node 10 and the target host 34. The target host 34 may be connected to a home network 26 by any number of networks, such as the IP networks 20 and 30, or it may be directly located on the home network 26. Alternatively, the target host 34 may be connected to the home network by other types of packet switched networks.

The home agent 24 may be implemented on a router on the mobile node's home network 26, and maintains current location information data, such as a network address of the packet data serving node 16, a mobile home network address assigned to the mobile node 10, and a secret key that is shared between the home agent 24 and the mobile node 10. In one embodiment, a tunnel may be established between the home agent 24 and the packet data serving node 16, and the home agent 24 and the packet data serving node 16 may communicate data via the established tunnel. For example, the home agent 24 and the packet data serving node 16 may establish a point-to-point tunnel using a Layer 2 Tunneling Protocol ("L2IP"). More information on L2TP may be found in a Request For Comments ("RFC"), RFC-2661, currently available at www.ietf.org.

The home agent 24 performs two different tasks for the mobile node 10. First, the home agent 24 performs a registration and authentication process to determine if the mobile node 10 is authorized on the home network 26. The authentication process may involve checking identification of the mobile node 10, such as through the use of the mobile node's unique serial number or manufacturing number, password authentication, and possibly checking if the mobile node's account is current and paid. The home agent's registration and authentication functions may be performed in conjunction with, or with the assistance of, a second device, such as an authentication, authorization, and accounting server, such as a Remote Authentication Dial-In User Service ("RADIUS") server. More information on the RADIUS server may be found in the RFC-2138.

The packet data serving node 18 also performs two distinct tasks for the mobile node 10. The packet data serving node 18 handles registration and session control for the mobile node 10, including sending registration request messages to the home agent 24, and processing registration response messages received from the home agent 24. Additionally, the packet data serving node 18 has tunneling capabilities for forwarding data packets from the home agent 24 for ultimate transmission to the target host 34, as well as de-tunneling data from the home agent 24 for ultimate delivery to the mobile node 10. The packet data serving node 18 may perform authentication, authorization and accounting functions in conjunction with, or with the assistance of, an authorization, authorization, and accounting server, such as the RADIUS server.

When the mobile node 10 initiates a communication session with the radio network node 16 by sending, for instance, a call setup indication to the radio network node 16 across a radio communication link, the radio network node 16 initiates a registration process with the packet data serving node 18. The radio network node 16 may be configured with a number of packet data serving nodes' network addresses, and the radio network node 16 may randomly select one of the packet data serving nodes to serve the mobile node 10.

According to one existing method, a radio network node may include a packet control function ("PCF") that may calculate a hash value based on, for instance, an International Phone Subscriber Interface (such as a phone number) of a mobile node, and the calculated hash may be used to select a packet data serving node's IP address. According to another alternative method, the packet control function may employ a round robin mechanism to select a packet data serving node. In such an embodiment, the packet control function may assign each subsequent arriving session to the next packet data serving node in its list, wrapping around to the first packet data serving node when the last packet data serving node is reached. The round robin mechanism distributes calls between packet data serving nodes; however, it does not take into account the type of call sessions being forwarded to each packet data serving node, for instance.

Therefore, some of the problems associated with the existing prior art mobile IP networks concern inefficient selection of packet data serving nodes by radio network nodes. For example, when a radio network node selects a packet data serving node, the radio network node does not have any load information of the selected packet data serving node. Therefore, using such a selection scheme, if the selected packet data serving node is overloaded, it may reject a registration request from the mobile node 10, thus, resulting in service delays for the mobile node 10.

To overcome problems associated with packet data serving node selection by radio nodes, an external foreign agent control node may be used to select a packet data serving node, and the selection may be based on memory usage, or processing power usage of the packet data serving node, for instance. The functionality of the foreign agent control node is described in the pending U.S. patent application Ser. No. 09/881,649 entitled "System and Method for Managing Foreign Agent Selections in a Mobile Internet Protocol Network," the entire content of which is incorporated herein by reference.

SUMMARY OF THE INVENTION

A system and method are shown for selecting a packet data serving node (PDSN) for a mobile node in an Internet Protocol network based on one or more service request parameters. A network node receives a message, such as a registration request message, associated with a mobile node. The message includes a service request parameter corresponding to a requested service. The network node uses the service request parameter to select the address of a packet data serving node (PDSN) offering the service. The network node then sends a response message directing a connection with the selected PDSN. The response message may be a registration denial message that includes the address of the selected PDSN. Alternatively, the response message may be a request for a connection with the selected PDSN. The service request parameter may be an international mobile subscriber identifier (IMSI) that identities a subscriber requesting a static IP address, in which case the network node directs a connection with a PDSN that offers an Internet connection with the static IP address.

BRIEF DESCRIPTION OF THE DRAWINGS

Exemplary embodiments of the present invention are described with reference to the following drawings, in which:

FIG. 5 is a block diagram illustrating an example of a heartbeat message format for messages sent from foreign agents to a foreign agent control node;

FIG. 6 is a block diagram illustrating an example of a heartbeat message format for messages sent from a foreign agent control node to foreign agents;

FIG. 7 is a flow chart illustrating a configuration of a radio network node;

FIGS. 8A and 8B are a flow chart illustrating a method for selecting a foreign agent on a foreign agent control node;

FIG. 9 is a message sequence scenario illustrating an example of a message flow for selecting a foreign agent on a foreign agent control node;

FIGS. 10A, 10B and 10C are a flow chart illustrating an example of a method for authenticating a mobile node associated with a foreign agent;

FIG. 11 is a message sequence scenario illustrating an example of a message flow for a first time mobile Internet Protocol registration of a mobile node with a foreign agent selected on a control node;

FIG. 12 is a message sequence scenario illustrating an example of a message flow for a first time simple Internet Protocol registration of a mobile node with a foreign agent selected on a control node;

FIGS. 15a and 15b illustrate steps performed by a system for selecting a PDSN.

DETAILED DESCRIPTION

Figure 1:
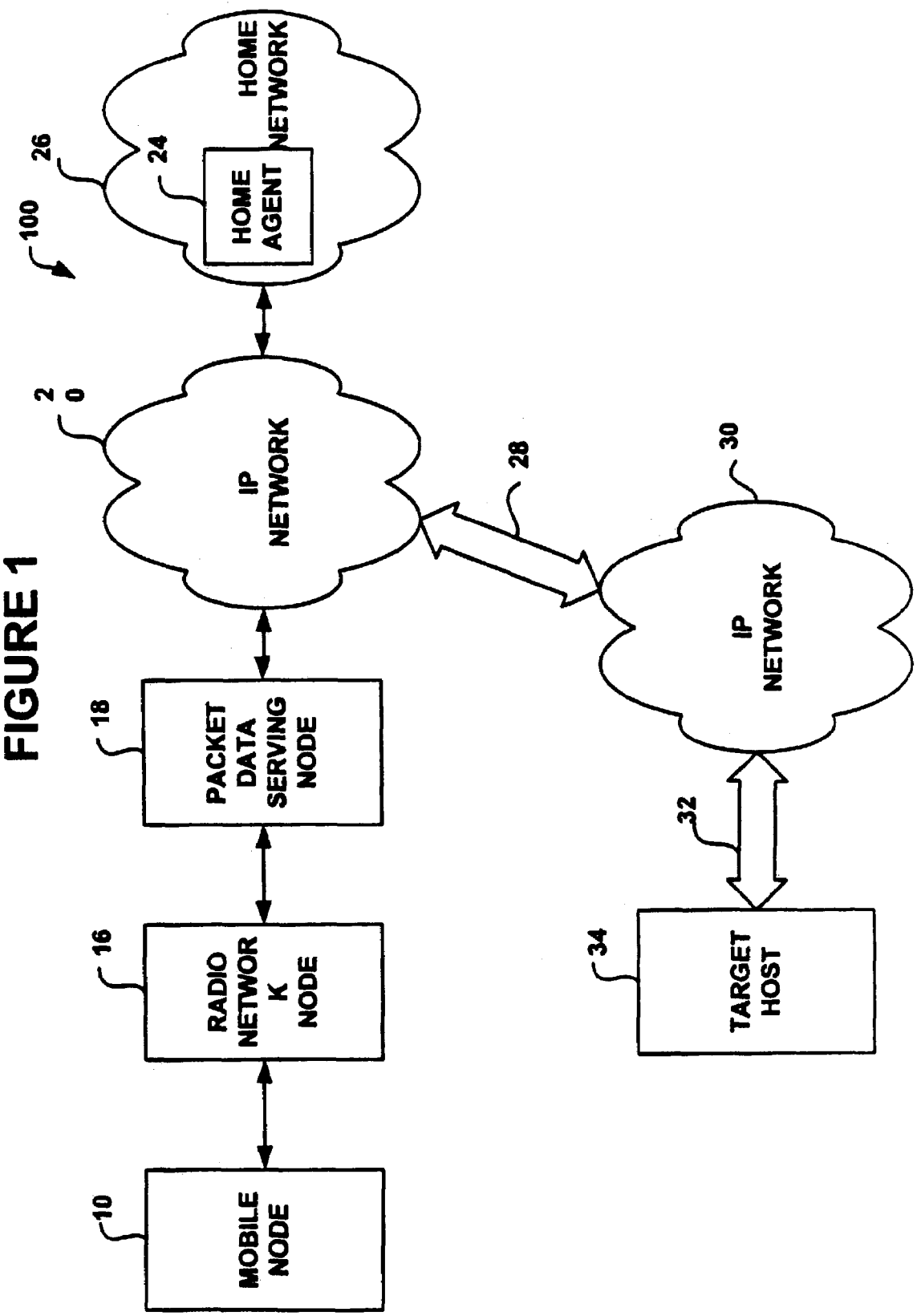
FIG. 1 is a block diagram illustrating an example of a prior art mobile IP network architecture.
Figure 2:
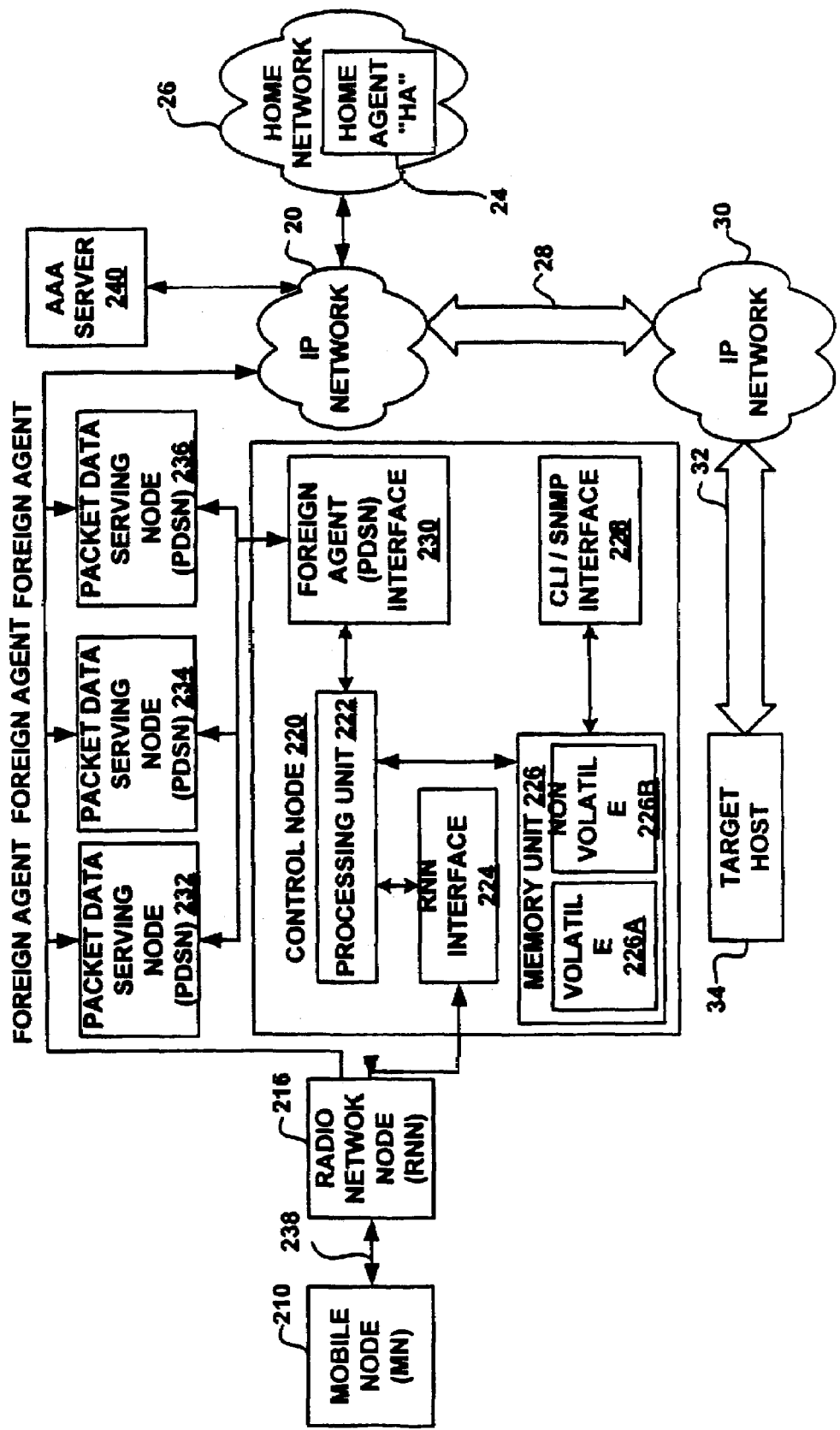
FIG. 2 is a block diagram illustrating an example of a mobile IP network architecture.

FIG. 2 is a functional block diagram illustrating an embodiment of a network architecture suitable for application in a system for selecting foreign agents for mobile nodes in a mobile IP network. FIG. 2 describes network entities typically employed in third generation mobile IP networks; however, it should be understood that the present invention is not limited to the network architecture described hereinafter, and the methods and apparatus described herein may be applied for managing the selection of foreign agents in any existing or later developed mobile IP systems. Referring to FIG. 2, a client device, such as a mobile node 210, communicates with a remote client device, such as the target host 34, on the IP network 30. The mobile node 210 is connected to a first network device, such as a radio node or packet control function (PCF) 216, via a radio connection 238 on a radio access network. In one embodiment, the radio node may include a radio network node ("RNN"), a base station control ("BSC") node or a Packet Control Node ("PCN"), for example. As illustrated in FIG. 1, the radio node is referred hereinafter as a radio network node. According to one embodiment of the present invention, the radio network node or PCF 216 communicates with a second network device, a foreign agent control node ("FACN") 220 and a plurality of packet data serving nodes ("PDSNs"). The FACN 220 manages foreign agents selection, such as a packet data serving node selection for mobile IP registration purposes. The FACN 220 may be referred to herein as a "control node", a "foreign agent control node", and the PDSNs may be referred herein as "foreign agents".

The FACN 220 includes a radio node mobile IP interface 224 for communicating with radio network nodes, such as the radio network node of PCF 216. When the radio network node 216 detects a call set up request from the mobile node 210, the radio network node 216 requests mobile registration service from the FACN 220 over the radio network node interface 224. When the FACN 220 receives a registration request, the FACN 220 selects a third network device to provide network services to the mobile node 210. In one embodiment, the FACN 220 selects a PDSN using a set of predetermined criteria and sends the selected PDSN network address to the radio network node 216. The FACN 220 further includes a PDSN interface 230 for communicating with the pool of PDSNs, such as the PDSNs 232, 234, and 236. In the embodiment illustrated in FIG. 2, the FACN 220 communicates via the PDSN interface 230 with FACN-managed PDSNs 232, 234, and 236. The PDSNs 232, 234, and 236 provide their capacity information capabilities, such as current call load factors, processing unit load factors, or memory load factors, via the PDSN interface 230.

In one specific embodiment, the PDSN interface 230 and the RNN interface 224 may be implemented in a Total Control Enterprise Network Hub commercially available from 3Com Corporation of Santa Clara, Calif. The Total Control product includes multiple network interface cards connected by a common bus. See "Modem Input/Output Processing Signaling Techniques," U.S. Pat. No. 5,528,595, granted to Dale M. Walsh et al. for a description of such interfaces. The interfaces may also be implemented in other devices with other hardware and software configurations and are not limited to implementations in a Total Control product.

In one embodiment, the FACN 220 uses the capacity information of the managed PDSNs to determine the ability of a PDSN to handle registration of a new mobile node. When the radio network node 216 registers the mobile node 210 with the FACN 220, the FACN 220 may first attempt to assign the registering mobile node 210 to the PDSN currently providing communication services to the mobile node. However, if the FACN has no active history for the mobile node 210, or if the PDSN currently serving the mobile node 210 is unavailable or invalid, a new PDSN is selected from a PDSN pool associated with the registering radio network node 216.

Referring back to FIG. 2, the FACN 220 further includes a memory unit 226. The memory unit 226 includes a volatile memory unit 226A and a nonvolatile memory unit 226B. In one embodiment, the FACN 220 may be configured with a number of configuration records. The configuration records may be stored in the nonvolatile memory unit 226B or in a configuration file. In an embodiment where the nonvolatile records are stored in the configuration file, any subsequent FACN startups may restore the configuration file. The configuration of the FACN 220 may be done via a Command Line Interface ("CLI") or a Simple Network Management Protocol ("SNMP") interface 228. The CLI/SNMP interface 228 provides means for adding, deleting and modifying configuration entries. However, it should be understood that other interfaces providing access to configuration records may be used as an alternative to the interface 226. In one embodiment, a hardware platform for the FACN 220 may include a Sun Microsystems Netra hardware platform. However, other hardware platforms could also be used.

One of the configuration tables in the nonvolatile memory 226B may include port numbers for exchanging control data between the FACN 220, the PDSNs 232, 234, 236 and the radio network node 216. For example, the FACN 220 may employ User Datagram Protocol ("UDP") ports for exchanging control data with the PDSNs and the radio network node 216. The FACN 220 may be configured to use an UDP port number 697 for exchanging data with the radio network node 216. The FACN 220 may further be configured to use default UDP ports 15000 and 15001 for communicating control data with the PDSNs. However, it should be understood that the present invention is not limited to using these port numbers, and the FACN 220 may employ different ports for communicating control data with the radio network node and PDSNs.

The secure communication between network entities in communication systems often requires a receiving network entity to authenticate the sending entity. One example of secure communications between network entities involves the use of digital keys that are shared by the communicating network entities. In such an embodiment, when a sending entity transmits a message to a receiving entity, the sending entity runs the message through a message digest algorithm using a secret key that is shared between the sending entity and the receiving entity, generating a value commonly referred to as a message digest. The message digest is then sent from the sending entity along with the message to the receiving entity that uses the message digest to verify whether the sending entity is a trusted entity. To do that, the receiving entity may extract the message digest from the received message and run the message through the same message digest algorithm. Then, if the message digest generated on the receiving entity matches the one extracted from the received message, the user may be considered as a trusted entity. The process for authenticating entities is further described in "IP Mobility Support," RFC-2002 (October 1996). However, the embodiments described herein are not limited to using the digital keys, and different or equivalent authentication methods may be used as well.

Referring again to FIG. 2, the nonvolatile memory unit 226B preferably stores a number of digital secret keys. As mentioned in the preceding paragraphs, the PDSNs may authenticate the mobile node 210 with the assistance of an authentication, authorization and accounting ("AAA") server 240. Thus, one of the keys may include an AAA-PDSN secret key that is used between a PDSN and the AAA server to authenticate messages, such as access-request or access-accept messages that are exchanged between the two entities during the authentication process. The AAA server 240 may be a Steel Belted RADIUS, Advanced Wireless Edition ("SBR-AWE") provided by a service provider "FUNK", for example. In one embodiment, the FACN 220 may store a single AAA-PDSN secret key for the use between the AAA server and the PDSNs associated with the FACN 220. However, more than one secret key could also be used, so that, for example, predetermined sets of PDSNs are associated with different secret keys for communicating with one or more AAA servers. For example, an AAA-PDSN secret key record may include a secret key stored with an IP address of an AAA server assigned to the key. Table 1 illustrates an exemplary FAAA-PDSN secret key record.

TABLE 1

| AAA IP ADDRESS | SECRET KEY |
| --- | --- |
| IP address of an AAA | Secret key for the IP address |

Additionally, the nonvolatile memory unit 226B may store FACN-PDSN and radio network node-PDSN secret keys. In one embodiment, one global secret key may be defined for the use between the FACN 220 and all PDSNs associated with the FACN 220. Table 2 illustrates an exemplary FACN-PDSN secret key record.

TABLE 2

| SECURITY PARAMETER INDEX | SECRET KEY |
| --- | --- |
| Security Parameter Index | Secret key for PDSN/FACN |

Similarly, the radio network node 216 and the PDSNs may use the same secret key. Table 3 illustrates an exemplary radio network node-PDSN secret key record.

TABLE 3

| SECURITY PARAMETER INDEX | SECRET KEY |
| --- | --- |
| Security Parameter Index | Secret key for PDSN/radio network node |

Further, according to one embodiment, PDSN IP addresses may be grouped based on the PDSN capabilities, for instance. Alternatively, PDSN IP addresses may be grouped based on the association with a predetermined FACN. In one embodiment, a system administrator may assign one or more PDSNs to a predetermined group. Alternatively, PDSNs may be automatically grouped to one or more groups, such as default groups, when they first register with the FACN 220, as will be described in detail below. Table 4 illustrates an example of a record for grouping PDSNs, where an IP address of a PDSN is assigned to a predetermined group number or a group identifier.

TABLE 4

| PDSN GROUP # | PDSN GROUP DESCRIPTION | PDSN IP ADDRESS LIST |
| --- | --- | --- |
| Group number/Group ID | Group description | PDSN IP ADDRESS |

Further, upon an initial FACN startup, a system operator may specify which radio network nodes may be served on the FACN 220. Additionally, a radio network node record may define a list of PDSN groups that may be selected to service radio network node requests. For example, if the operator fails to assign at least one PDSN group to a radio network node, the radio network node may be assigned to a default PDSN group when it attempts to register with the FACN 220 for the first time. Table 5 illustrates an exemplary radio network node-PDSN group assignment record that may be saved in the nonvolatile memory unit 226B. It should be understood that the radio network node may be assigned to one or more PDSN groups.

TABLE 5

| RADIO NETWORK NODE IP ADDRESS | PDSN GROUP LIST |
|---|---|
| IP address of an radio network node | A list of PDSN group numbers/Group Ids for the radio network node |

Further, the FACN 220 may keep a number of volatile records that are created during the operational stage of the FACN 220. For example, such records may be stored in the volatile memory unit 226A. The FACN 220 may maintain volatile PDSN profile records and volatile mobile node records. The FACN 220 may create PDSN profile records as the PDSNs report their presence in the network. The PDSN profile records are dynamically changed as PDSNs become inactive or as new PDSNs are added to the network. According to one exemplary embodiment, PDSNs are configured to provide their load status information via periodic messages, hereinafter referred to as heartbeat messages. Each PDSNs is configured to periodically send, for example, its processing load factor, call load factor, and/or memory load factor to the FACN 220. For example, the processing load factor of a PDSN may be associated with the processing capacity of the PDSN, the call load factor may be associated with a number of calls that the PDSN is currently serving, and the memory load factor may be associated with memory resources, either available or used, on the PDSN. According to one embodiment, the FACN 220 may be configured via the CLI/SNMP interface 226 with a number of threshold levels that define when a PDSN is no longer available for selection. For example, a call balance threshold may define a call level below which the PDSN may be selected to service new calls, independently of any call balancing mechanisms. In one embodiment, the FACN 220 may be automatically configured with a number of default threshold levels, such as, for example, 100% processing load, 100% memory load, and 4000 calls load level. In one embodiment, the FACN 220 may be configured with a number of thresholds that vary among the various PDSNs. Further, it should be understood that different threshold levels could also be used. For example, a PDSN group including a number of PDSNs may be configured to serve one or more types of high-capacity sessions. In such an embodiment, a threshold call load level of PDSNs in such a group may be lower than a threshold call load level of PDSNs arranged to service lower-capacity sessions. It should be understood that different embodiments are possible as well.

Using a heartbeat mechanism to report a PDSN's activity status, if a PDSN fails to consecutively send a number of heartbeat messages, the FACN 220 may identify such a PDSN as inactive or unavailable to serve incoming sessions. The FACN 220 may be configured with a "missed heartbeat" variable indicating a number of missed heartbeats after which a PDSN should be considered inactive. Further, each PDSN profile record may include a lifetime timer defining a time interval within which the FACN 220 should expect to receive a next heartbeat message from the PDSN in the record. Table 6 illustrates an example of a PDSN profile record that may be created on the FACN 220 for each PDSN during the operational stage of the FACN 220.

TABLE 6

| PDSN | STATUS | MISSED HEARTBEAT COUNT | LIFETIME TIMER | LOAD FACTOR |
|---|---|---|---|---|
| PDSN IP address | Inactive/ Active | Number of missed heartbeat messages | Heartbeat message timer | Processing/ Memory/ Call Loads |

Further, the FACN 220 may maintain mobile user information data in mobile node profiles, or mobile node records, that are created on the FACN 220 upon user registrations with a FACN-managed PDSN. Each time a mobile node registers with one of the FACN-managed PDSNs, the registering PDSN may send the mobile node's data, such as an AAA profile and mobile session information, to the FACN 220. In such an embodiment, if no record exists for the mobile node on the FACN 220, the FACN 220 may create a new mobile node profile record. Alternatively, if such a record already exists, the FACN 220 may update the currently existing record associated with the mobile user. Further, if such a record already exists, but for a different PDSN than the one sending the update, then, a "PDSN handoff" has occurred, that is the mobile node has roamed from one radio node to a new radio node that is not associated with the original serving PDSN, or that the original PDSN is unavailable for some other reasons, such as, its call load is excessive or it is no longer sending heartbeat messages, for example. According to one embodiment, when the FACN 220 detects the handoff, the FACN 220 may send an update message to the PDSN specified in the mobile node profile. Upon the receipt of the message, the PDSN may terminate its communication link with the radio node from which the mobile node was handed-off.

A mobile node profile record may include a mobile telephone number or an International Mobile Subscriber Identity ("IMSI"), a mobile connection identifier ("MOBILE NODE-ID"), one or more sessions indexed by a Network Address Identifier ("NAI"), or a NAI user profile. Table 7 illustrates an exemplary mobile node profile record that may be created on the FACN 220 upon receiving registration information from a PDSN as the mobile node registers with the PDSN.

TABLE 7

| IMSI/MOBILE NODE-ID | MOBILE SESSION NAI | PDSN IP ADDRESS | MOBILE SESSION STATUS | MOBILE PROFILE |
|---|---|---|---|---|
| Mobile phone number and connection ID | Mobile session NAI (user@domain) | IP address of the last PDSN | Active or idle | AAA profile of the mobile session |

It should be understood that the present invention is not limited to the use within the system illustrated in FIG. 2.

More, fewer or different components, connections, interfaces could also be used. For example, the volatile and nonvolatile records described in the preceding paragraphs may be stored in one or more databases located on the FACN 220 or may be stored on a volatile or nonvolatile media on a network server in communication with the FACN 220. Additionally, the radio node is not limited to the radio network node, and different types of radio nodes could also be used, such as a Base Station Controller ("BSC") node or a Packet Control Function ("PCF") node, for example. Further, the arrangements described herein are shown for purposes of illustration only, and those skilled in the art will appreciate that other arrangements and other elements, such as interfaces or functions, whether or not known in the art, can be used instead, and some elements may be omitted altogether. Additionally, as in most communications applications, those skilled in the art will appreciate that many of the elements described herein are functional entities that may be implemented as discrete components or in conjunction with other components, or as firmware or software, in any suitable combination and location.

Figure 3:
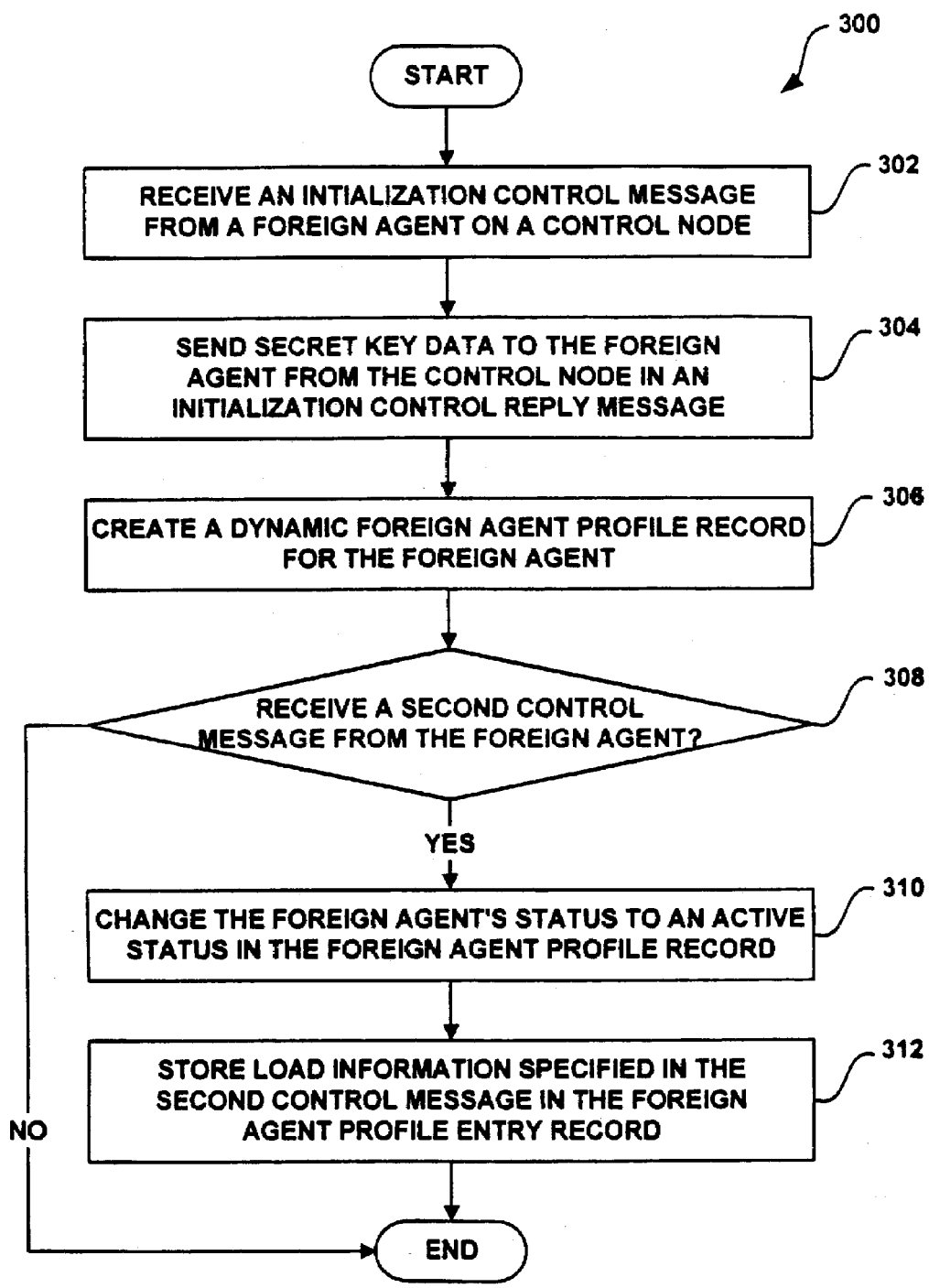
FIG. 3 is a flow chart illustrating an exemplary method for foreign agent discovery process on a foreign agent control node.

FIG. 3 is a flow chart illustrating a method 300 for a foreign agent discovery process, such as a PDSN discovery process. According to one embodiment, the foreign agent discovery process is implemented using a network protocol between the foreign agents and a control node, such as the FACN 220. When the foreign agent comes up, the foreign agent sends an initialization control message to the control node, thus, conveying its ability to handle mobile node registration requests. Referring to FIG. 3, at step 302, a control node receives an initialization control message from a foreign agent. Responsive to receiving the initialization control message, the control node generates an initialization control reply message including secret key data. For example, the secret key data may include a first secret key that may be used when the foreign agent communicates with a radio network node, and a second secret key is used when the foreign agent communicates with a predetermined AAA network server. At step 304, the control node sends the initialization control reply message to the foreign agent. Further, at step 306, the control node dynamically creates a foreign agent profile record and marks the foreign agent as an inactive foreign agent. In one embodiment, the dynamic foreign agent profile entry may be stored in a memory configured to store volatile records. However, different embodiments are possible as well. For example, the control node may be configured to store the volatile records in one or more databases.

Responsive to receiving the initialization control reply message from the control node, the foreign agent may start its normal operation of sending periodic control messages to the control node. According to an exemplary embodiment, the control messages that are periodically sent from the foreign agent indicate that the foreign agent is active and include load data associated with the foreign agent, such a call load factor, processing load factor, and/or memory load factor associated with the call, processing and memory resources that are currently used by the foreign agent. At step 308, the control node determines whether a second control message has been received from the foreign agent. If the second message is not received, the method 300 terminates, and the foreign agent's inactive status in the foreign agent profile record is not changed. If the second control message is received by the control node, at step 310, the control node modifies the foreign agent's inactive status in the foreign agent's record to an active status. Further, if the second control message includes load factors associated with the foreign agent, at step 312, the control node stores the load factors in the foreign agent profile record. Further, the control node may send a reply acknowledgement message to the control node, thus, indicating its active state and the receipt of the second message.

In the method 300, the control node may be the FACN 220, described above, and the foreign agent may be the PDSN 232. However, it should be understood that the method 300 is not limited to the use of any particular hardware or software and fewer, more, different or equivalent network devices may also be used.

Figure 4:
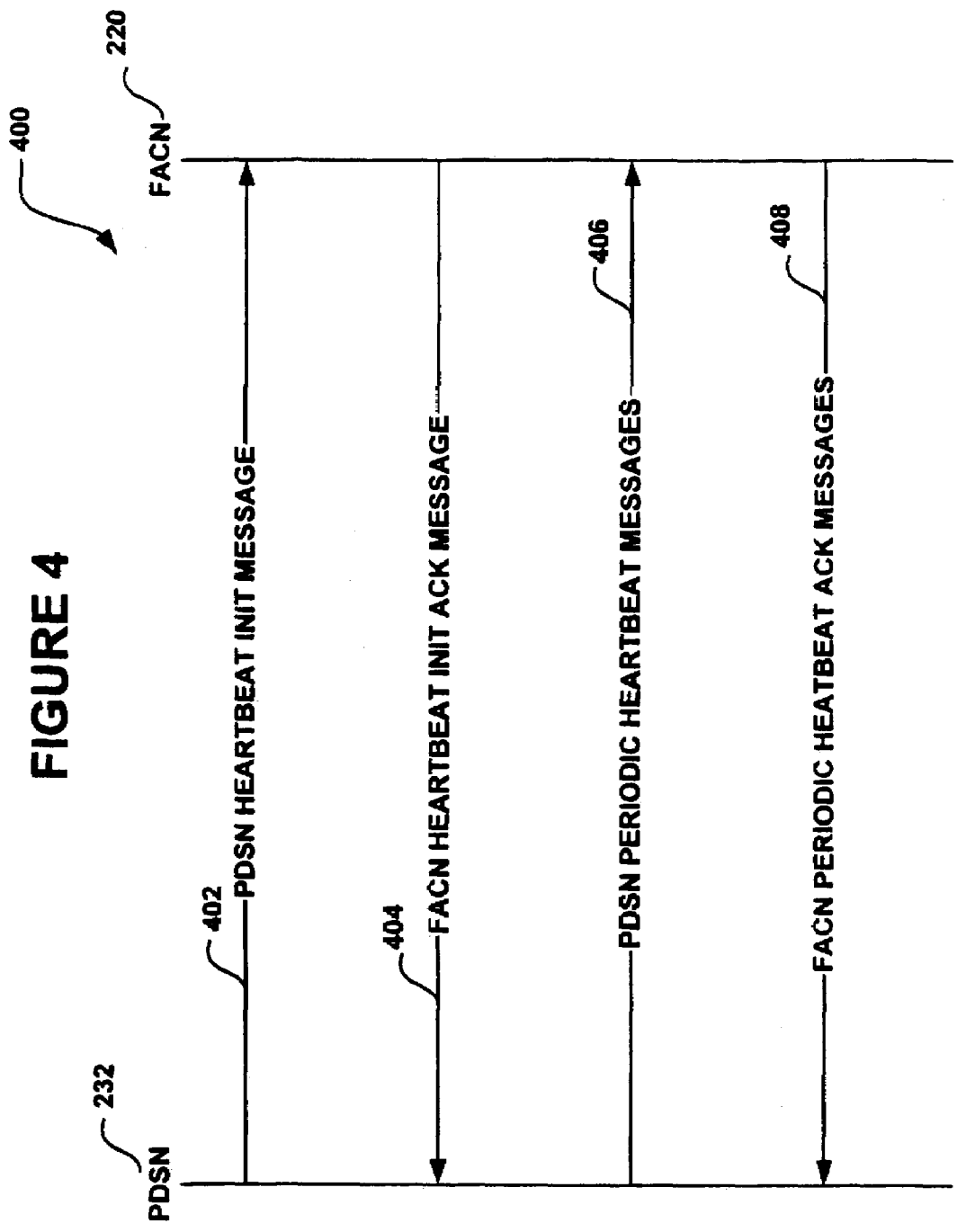
FIG. 4 is a message sequence scenario, according to one embodiment of the present invention, illustrating an exemplary message flow for discovering foreign agents on a foreign agent control node using heartbeat message.

According to an exemplary embodiment, the control node, FACN 220, and the associated foreign agents, PDSNs, may use a heartbeat messaging mechanism to convey the foreign agent availability, control node availability and foreign agent load factors. FIG. 4 is an example of a message sequence scenario 400 illustrating a heartbeat-messaging scheme that may be used between a foreign agent and a control node. A foreign agent, such as the PDSN 232, starts communication with a control node, such as the FACN 220, via a Heartbeat Initialization ("INIT") message 402. Responsive to receipt of the Heartbeat INIT message 402, the control node generates a Heartbeat INIT Acknowledge message 404, including secret keys to be used on the foreign agent for communication with the radio network node 216 and a predetermined AAA server, and transmits the message 404 to the foreign agent. Subsequently, the foreign agent sends to the control node periodic Heartbeat messages 406 including its processing, memory and call load factors, or a status override parameter indicating that the foreign agent is unavailable. In accordance with a preferred embodiment, the heartbeat messages are periodic in nature. The control node responds to each periodic heartbeat message with a Heartbeat Acknowledge message 408. In one embodiment, the Heartbeat Acknowledge message 408 may include a unique key tag identifier associated with the AAA server and radio network node keys. The control node may update keys available to the foreign agent, and if one or more keys are updated, the control node may define a new key tag identifier in a Heartbeat Acknowledge message. If the foreign agent receives a new key tag identifier, the foreign agent may request new keys via a Heartbeat INIT message.

According to one embodiment, the periodic Heartbeat messages are indicative of the foreign agent's activity and include foreign agent's load factors. As mentioned in reference to the preceding paragraphs, the control node may be configured to remove a foreign agent from a list of active foreign agents if a predetermined number of periodic heartbeat messages are not received or if a predetermined number of periodic heartbeat messages fails authentication on the control node. According to another embodiment, heartbeat messages, such as a Heartbeat INIT and periodic Heartbeat messages, may include heartbeat intervals so that the control node may determine when to expect to receive the next heartbeat message from the foreign agent based on the heartbeat interval specified by the foreign agent in the previous heartbeat message.

FIG. 5 is a block diagram illustrating a preferred format 500 of heartbeat messages, such as preferred formats of the Heartbeat INIT message 402 and the periodic Heartbeat messages 406. The message format 500 includes a plurality of fields: an IP header 502, an UDP header 504, a message type field 506, a reserved field 508, a length field 510, a heartbeat interval field 512, a reserved field 514, a PDSN address field 516, and a plurality of sub-fields. The IP header 502 may have a format of an IP header. In such an embodiment, a destination field in the IP header may include an IP address of the control node and a source address field may include an IP address of a source foreign agent, such as the PDSN 232 of FIG. 2. However, the IP header is not limited to the IP header, and different IP header formats could also be used. Further, in one embodiment, the UDP header format 504 may have a format of the UDP header, for instance. Alternative formats for the heartbeat messages may also be used. For example, the heartbeat messages may include more or fewer fields and/or subfields than are shown in FIG. 5, or arrangement of the fields and/or subfields may be changed.

The type field 506 defines a type of the Heartbeat message, such as a PDSN INIT Heartbeat or a PDSN periodic Heartbeat. Table 8 illustrates an example of message type values for the two messages. Other type values may alternatively be used.

TABLE 8

| TYPE | DETAILS |
| --- | --- |
| 0x02 | PDSN INIT Heartbeat |
| 0x01 | PDSN periodic Heartbeat |

Further, the reserved fields 508 and 514 may be left blank for a future use or, alternatively, eliminated. The length field 510 may define a message length, for example, in octets, and the heartbeat interval 512 may define a time interval during which time the control node should receive the next heartbeat message. The foreign agent address field 516 includes, for example, an IP address of the foreign agent sending the message.

The plurality of sub-fields includes load factors of the sending foreign agent. In the message format illustrated in FIG. 5, there are three subtype load fields: a call load field 518, a processing usage field 524, and a memory usage field 536, with the respective length fields 520, 526, and 538, and value fields 522, 528, and 534 defining the current load factors of the variables defined in the fields 518, 524, and 536. Table 9 illustrates exemplary values that may be used for the subtype fields 518, 524, and 536. However, it should be understood that different values for the call load, processing usage, and the memory usage fields could also be used. Further, fewer, more, different or equivalent foreign agent capacity variables could also be used.

TABLE 9

| SUBTYPE | DETAILS |
| --- | --- |
| 0x12 | Foreign Agent Call Load |
| 0x52 | Foreign Agent CPU Usage |
| 0x32 | Foreign Agent Memory Usage |

Further, the message format of FIG. 5 includes an authentication type field 536 with an identifier of an authentication mode employed on the foreign agent, a length field 538 including a length of the authentication field 536, a Security Parameter Index ("SPI") fields 540, 542 and an Authenticator field 544.

FIG. 6 illustrates an example of a message format 600 for heartbeat messages that may be sent from the control node in response to receiving a heartbeat message from a foreign agent, such as the FACN Heartbeat INIT ACK message 404 or the FACN periodic Heartbeat ACK message 408 illustrated in FIG. 4. The message format illustrated in FIG. 6 is similar to the one shown in FIG. 5, and includes an IP header field 602, an UDP header field 604, a message type field 606, a reserved field 608, a length field 610, and a PDSN address field 612. Like the message format 500 in FIG. 5, the message format 600 is merely an example of a preferred embodiment and alternative formats may be used. For example, the heartbeat messages may include more or fewer fields and/or subfields that are shown in FIG. 6, or the arrangement of fields and/or subfields may be changed.

In FIG. 6, the IP header field 602 includes a source address field with an IP address of the FACN 220, and a destination address field with an IP address of a destination PDSN. Further, the message type field identifies a type of the heartbeat message that is generated by the FACN 220. Table 10 illustrates an example of type values that may be used to define a heartbeat INIT ACK message and periodic ACK message type.

TABLE 10

| TYPE | DETAILS |
| --- | --- |
| 0x12 | Heartbeat INIT ACK from FACN |
| 0x11 | Periodic Heartbeat ACK from FACN |

The message format 600 also includes a key tag value field 614, a reserved field 616, a subtype PDSN-radio network node key field 618, a length field 620 associated with the subtype key field, an SPI field 622, and secret fields 624. The key tag value field 614 includes a sequential key tag identifier for the AAA and radio network node keys stored on the FACN 220. The sequential key tag identifiers may be modified on the FACN 220 each time one or both keys are changed. If a PDSN receiving a heartbeat ACK message from the FACN 220 detects that a key tag identifier specified in the received message is different from a key tag identifier stored locally on the PDSN, the PDSN may send a Heartbeat INIT message to cause the FACN 220 to refresh its keys. The subtype PDSN-radio network node key field 618 identifies the type of a secret key in the secret fields 624. According to the embodiment illustrated in FIG. 6, the subtype PDSN-radio network node key field 618 includes an identifier associated with the PDSN-radio network node key that is included in the secret key fields 624.

Further, the message includes a subtype PDSN-AAA key field 626, a length field 628, an AAA IP address field 630, secret fields 632, an authentication type field 634, a length field 636, an SPI field 638, and an SPI authenticator field 640. The subtype PDSN-AAA key field 626 identifies that the secret fields 632 include an AAA key that may be used between the PDSN and an AAA server. In one embodiment, a network address, such as an IP address, of the AAA server is specified in the AAA IP address field 630. Table 11 illustrates exemplary type values that may be used in the subtype fields 618 and 626. However, different values could also be used.

TABLE 11

| SUBTYPE | DETAILS |
| --- | --- |
| 0x41 | PDSN-radio network node key |
| 0x51 | PDSN-AAA key |

FIG. 7 is a flow chart illustrating a method 700, in accordance with a preferred embodiment, for a radio network node operation. At step 702, a radio network node is configured with a network address of a control node as a preferred foreign agent network address. In such an embodiment, when the radio network node detects a mobile node in its service area, the radio network node queries the control node prior to attempting to register the may retry to register with the foreign agent control node or, alternatively, may register with another foreign agent with which it was configured.

In the method 700 described in reference to FIG. 7, the mobile node may include the mobile node 210, the radio network node may include the radio network node 216, the foreign agent control node may include the FACN 220, and the foreign agent may include the PDSN 232, as illustrated in FIG. 2. However, the exemplary method is not limited to these devices, and fewer, more, or different devices may alternatively be used to perform the steps recited in FIG. 7.

As mentioned in the preceding paragraphs, one of the control node's functions is to select a foreign agent to service the radio network node's mobile client registration requests. When the control node receives a registration request message from the radio network node 216, the control node does not process the registration request as a typical foreign agent normally does. Instead, it selects a foreign agent, such as one of the PDSNs 232, 234, or 236 illustrated in FIG. 2 that can service the mobile client registration. The control node may use any appropriate selection algorithm to determine a foreign agent that is suitable to service a mobile client registration.

FIGS. 8A and 8B are a flow chart illustrating a method 800 that may be controlled on a control node for selecting a foreign agent to service a mobile client's registration request. At step 802, the control node receives a registration request message from a radio network node responsive to detecting a mobile node in a service area of the radio network node. The registration request message includes the mobile node's information, such as mobile node's home agent data, the radio network node's data, and a request for the mobile node's registration. In one embodiment, the registration request message may have a message format described in the RFC 2002; however, different message formats may alternatively be used.

At step 804, the control node authenticates the radio network node upon receipt of the registration request message. Upon a successful authentication of the radio network node, at step 806, the control node determines if at least one session associated with the mobile node is active. To do that, the control node may determine if user information associated with the mobile node is available on the control node. In one embodiment, the control node may retrieve its mobile user information records to determine whether such a record exists for the mobile user specified in the registration request message. In one embodiment, the mobile user information records include, among other parameters described in reference to Table 7, foreign agent-mobile user binding information. According to a preferred embodiment, the foreign agent-mobile user information is updated on the control node each time the mobile node is assigned to a new foreign agent. Thus, if the mobile node's status is active, the foreign agent in the record corresponds to the foreign agent that is currently serving the mobile node.

In one embodiment, if the control node has the mobile user information record available, the control node attempts to first select the foreign agent that is currently serving the mobile node. At step 808, the control node determines a foreign agent associated with the mobile node using the mobile user information record. At step 810, the control node determines if the foreign agent associated with the mobile node is available to service the mobile node registration request. To do that, the control node may invoke an information record associated with the foreign agent to determine load factors of the foreign agent. According to one embodiment, the load factors may include a memory load factor, a processing load factor and a call load factor associated with the foreign agent. The control node may be configured with threshold levels for each of the load factors defining maximum limits for the memory usage, processing usage or call load on the foreign agent. The control node may then verify the availability of the foreign agent by determining whether the load factors of the foreign agent do not exceed the threshold levels.

If the foreign agent is available to service the registration requests of the mobile node, then, at step 812, the control node determines if the particular foreign agent, determined at step 808, is a valid foreign agent for the radio network node. To do that, the control node retrieves a radio network node information record that defines a group of foreign agents associated with the radio network node. If the evaluated foreign agent is one of the valid foreign agents for the radio network node, then, at step 814, the control node generates a registration reply message including a network address, such as an IP address, of the foreign agent selected to service the radio network node request.

However, if the control node determines that the mobile client is inactive (step 806), or that the foreign agent is not available (step 810), or not valid for the radio network node, then the control node applies a search selection algorithm to determine a foreign agent that may serve the radio network node request. According to a preferred embodiment, the control node applies the search selection algorithm to one or more foreign agent groups associated with the radio network node. The foreign agent configuration for each radio network node may be done, for example, based on a number of specific criteria, which may include, for example, a geographic proximity between the radio network node and foreign agents, directional requirements (i.e. east to west), or a shortest network path between the radio network node and the foreign agent. In one embodiment, the radio network node may be associated with a number of foreign agent groups, and each group may include a number of foreign agents. In such an embodiment, the search selection algorithm for selecting a foreign agent to serve the radio network node request may be applied, in a defined order, to each foreign agent group associated with the radio network node and to search, in the defined order, each foreign agent within each examined foreign agent group. According to an exemplary embodiment, the search selection algorithm that is used to evaluate the foreign agent load factors initially loads foreign agents up to a configured call balanced threshold, and then uses a load balancing to determine a foreign agent, as described in greater detail below.

Thus, if the control node determines that the mobile client is inactive (step 806), the foreign agent is not available (step 810), or not valid for the registering radio network node (step 812), then, the method 800 continues at step 816, where the control node determines at least one foreign agent group associated with the radio network node. At step 818, the control node determines if the foreign agents in each group have been front-loaded up to a predetermined call balance threshold. If the control node determines that at least one foreign agent has a call load lower than the predetermined call balance threshold, the control node preferably selects the first such foreign agent to service the registration request of the radio network node. It should be understood that one or more foreign agent may be configured to serve a predetermine type of communication sessions such as high-speed or high-bandwidth sessions. The call balance threshold of such foreign agents may be lower than of other foreign agents. At step 820, the control node generates a registration reply message including a network address, such as an IP address, of the foreign agent that has the call load lower than the call balance threshold.

If all foreign agents associated with the foreign agent groups of the radio network node have been already front-loaded up to, for example, a predetermined call balanced threshold load, the control node applies a load balancing scheme to select a foreign agent for the radio network node. Alternatively, the foreign agent may be selected based on the type of the communication session. However, it should be understood that the present invention is not limited to front-loading the foreign agents up to the predetermined call balanced threshold load, and different embodiments are possible as well. The load-balancing scheme may be based on load factors of the foreign agents associated with the radio network node. At step 822, the control node applies a load-balancing method to determine a foreign agent to service the registration request of the radio network node. The control node determines the foreign agent using the load factors associated with each foreign agent. In one embodiment, the control node may select a foreign agent that has the least number of calls, however, different embodiments are possible as well. For example, the foreign agent may be selected based on the highest processing capacity or the most memory availability. Alternative search selection algorithms may also be used. For, example, a foreign agent may be selected using a load balancing technique, but without front-loading. As a further example, the search selection algorithm may be applied to foreign agents without regard to any defined order. These and other alternatives will be apparent to those skilled in the art upon reading this detailed description.

At step 824, the control node generates and sends a registration reply message to the radio network node. The registration reply message includes a network address, such as an IP address, of the foreign agent that has been determined using the load-balancing method.

In the method 800 described with reference to FIGS. 8A and 8B, the mobile node may include the mobile node 210, the radio network node may include the radio network node 216, the foreign agent control node may include the FACN 220, and the foreign agent may include the PDSN 232, 234 or 236 as illustrated in FIG. 2. However, the method 800 is not limited to these network devices, and fewer, more, or different devices may alternatively be used as long as such devices are operable to perform the steps shown in FIGS. 8A and 8B.

FIG. 9 is a block diagram of a message sequence scenario 900 illustrating a foreign agent selection method. The block diagram includes the mobile node 210, the radio network node 216, the FACN 220 and the PDSN 232, as illustrated in FIG. 2. When the mobile node 210 roams into a service area of the radio network node 216, the mobile node 210 sends a service origination ("SO") message 902 to the radio network node 216, and the radio network node 216 responds with a base origination ("BS") acknowledge order message 904. Upon receiving the BS acknowledge message 904 at the mobile node 210, the mobile node 210 and the radio network node 216 set up a communication link such as a tunnel communication link illustrated by reference number 906.

REGISTRATION REQUEST MESSAGE

Upon establishing the communication link between the mobile node 210 and the radio network node 216, the radio network node 216 sends a registration request message 908 to the FACN 220. As illustrated in FIG. 9, the registration request message 908 includes a lifetime parameter defining a lifetime value associated with the message, and mobile node-home agent extensions defining user profile parameters, for example. When the FACN 220 receives the registration request message 908, the FACN 220 selects a PDSN for the mobile node 210 based, for example, on the load and/or processing factors, International Mobile Subscriber Identity and last serving PDSN of the mobile node 210, as illustrated in block 910. When the FACN 220 selects a PDSN to service the registration request, the FACN 220 generates and sends to the radio network node 216 a registration reply message 912. According to one embodiment of the present invention, the FACN 220 does not provide foreign agent functionality and, instead, it selects PDSNs using a predetermined set of criteria, described in reference to FIGS. 8A and 8B. Thus, the registration reply message 912 includes a registration rejection code 136, for instance in which no suitable foreign agent is identified, or the registration reply message 912 includes a network address, such as an IP address, of the PDSN selected by the FACN 220 (in this example, the IP address of the PDSN 232).

When the radio network node 216 receives the registration reply message 912 including the network address of the selected PDSN, the radio network node 216 sends a registration request message 914 to the PDSN specified in the reply message. According to the embodiment illustrated in FIG. 9, the radio network node 216 sends the registration request message 914 including a lifetime parameter and mobile node-home agent extensions to the PDSN 232. Upon an authentication of the mobile node 210, as described below, the PDSN 232 sends a registration reply message 916 to the radio network node 216. When the radio network node 216 receives the registration reply message 916 including a registration accept response from the PDSN 232, the mobile node 210 may establish a communication link, such as a point-to-point communication link, to the PDSN 232, as illustrated in 918. Upon establishing the communication link, the mobile node 210 registers with the PDSN 232, and the mobile node 210 may start transmitting user data to a target host via the PDSN 232.

When the mobile node 210 establishes a communication link with the PDSN 232 and sends a registration request message 914 to the PDSN 232, the PDSN 232 is arranged to authenticate the request. According to an exemplary embodiment, the FACN 220 maintains database records, for example, as illustrated in Table 7, of mobile clients successfully authenticated in previous registrations. Each time a mobile client registers and the mobile client is not cached in the FACN database, a PDSN with which the mobile client registers sends AAA profile information to the FACN 220. Further, according to one embodiment, if the mobile client is authenticated and has an active status, the FACN 220 may provide the cached AAA profile information to a PDSN serving the mobile node 210, allowing the PDSN to skip AAA authentication.

Figure 10B:
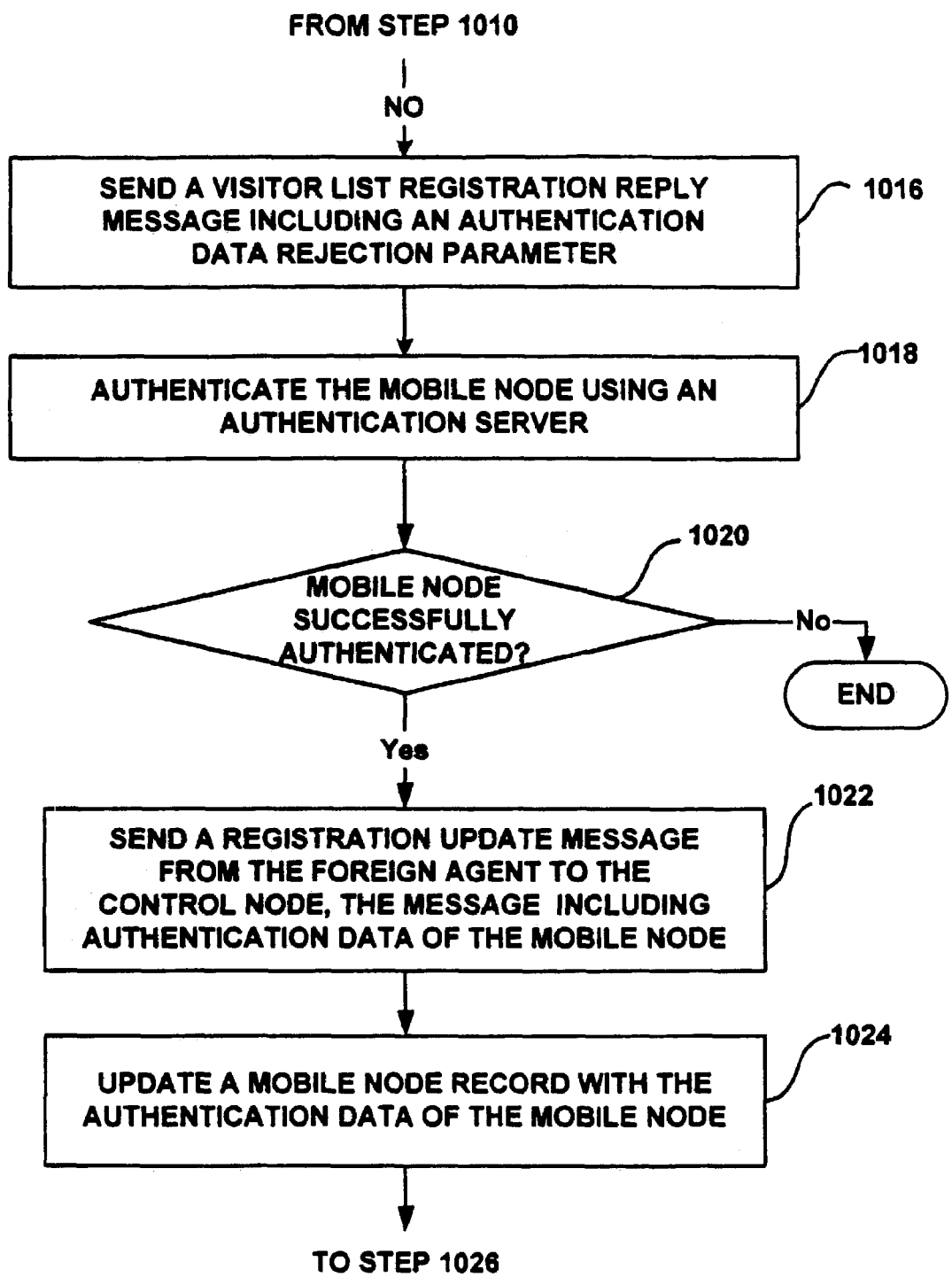

FIGS. 10A, 10B and 10C are a flow chart illustrating a method 1000 for mobile node first time registration with a foreign agent, according to one embodiment of the present invention. Referring to FIG. 10A, when a radio network node detects a new mobile node and successfully registers with a foreign agent selected on a control node, at step 1002, a communication link is established between the mobile node and the foreign agent specified by the control node. For example, the mobile node may establish a point-to-point communication link with the foreign agent. At step 1004, the mobile node sends a registration request message to the foreign agent. According to an exemplary embodiment, the foreign agent stores visitor list records including a list of mobile sessions associated with mobile nodes that are serviced on the foreign agent. The mobile sessions in the visitor list records on the foreign agent are associated with mobile nodes that are serviced by the foreign agent and, thus, have been previously authenticated. At step 1006, the foreign agent determines if a visitor list record exists for the registering mobile node. If the foreign agent has the mobile node in its local visitor list records, the method 1000 continues at step 1030, described in greater detail below. If the foreign agent control node does not have the mobile node in the visitor list records, then, at step 1008, the foreign agent sends to the control node a visitor list registration request message including an authentication data request.

When the control node receives the visitor list registration request message from the foreign agent, at step 1010, the control node determines if the mobile node has been already authenticated, and, thus, if the control node has authentication data for the mobile node. To do that, the control node may retrieve a mobile user's record including data associated with the mobile node's user. Further, using the mobile user's database record, the control node may determine an activity state of the mobile node. In one embodiment, the control node determines if the mobile node has an active session status. If the control node determines that the authentication data for the mobile node is not available, or that the mobile user session in the record is defined as inactive, the control node rejects the visitor list registration request, and, at step 1016, sends to the foreign agent a visitor list reply message including an authentication data rejection parameter.

When the foreign agent receives the reply message including the authentication data rejection parameter, the foreign agent may employ other means to authenticate the mobile node's client. According to one embodiment, at step 1018, the foreign agent queries an authentication network server to authenticate the mobile node. Next, at step 1020, the foreign agent determines whether the mobile node client has been successfully authenticated. If the mobile node has failed the authentication, the method 1000 terminates. If the authentication process for the mobile node is successful, then, at step 1022, the foreign agent sends to the control node a registration update message including authentication data of the mobile node. When the control node receives the registration update message, at step 1024, the control node updates or creates a new mobile user's record with the received authentication data of the mobile node. It is possible for the control node to receive the registration update message including authentication data of the mobile node indicating a foreign agent that is different than the one that originally sent an original update message for the registering mobile node, thus, indicating the foreign agent handoff. At step 1026, the control node determines whether the foreign agent in the update message is the same foreign agent as previously authenticated. If the foreign agent is different, at step 1028, the control node sends a registration update message to the foreign agent previously serving the mobile node. When the previously serving foreign agent receives the registration update message from the control node indicating that the mobile node has registered with a new foreign agent, at step 1030, the previously serving foreign agent may terminate its communication link to the radio node that previously serviced the mobile node. The foreign agent handoff can occur for a variety of reasons, such as when a mobile node's roams to a radio node that is not defined to communicate with the previously serving foreign agent, or when the previously serving foreign agent has exceeded one of its load thresholds. The foreign agent handoff will be further described in FIG. 13.

Referring back to step 1010, if the control node determines that the authentication data for the mobile node's user is available and the state of the mobile node specified in the mobile user's record is active, the control node returns the authentication data to the foreign agent, thus, allowing the foreign agent to skip the authentication process. In such an embodiment, at step 1012, the control node sends a visitor list registration reply message including authentication data associated with the mobile node to the foreign agent. At step 1014, the foreign agent receives the visitor list reply message from the control node.

When the foreign agent has authentication data for the mobile node, then, at step 1032, the foreign agent registers with a home agent of the mobile node. In one embodiment, the registration process with the home agent may include sending from the foreign agent to the home agent a registration request message, and receiving a registration reply message at the foreign agent from the home agent. When the foreign agent successfully registers with the home agent, then, at step 1034, the foreign agent sends to the mobile node a registration reply message. When the mobile node receives the registration reply message from the foreign agent, the mobile node may start communicating data to a target host via the foreign agent and the home agent.

In the method 1000 described in reference to FIGS. 10A, 10B and 10C, the mobile node may include the mobile node 210, the foreign agent control node may include the FACN 220, the home agent may include a home agent 24, the authentication server may include a RADIUS server, and the foreign agent may include the PDSN 232, 234 or 236 illustrated in FIG. 2. However, the exemplary method is not limited to these devices, and fewer, more, or different devices may alternatively be used, provided such devices are operable to perform the steps of FIGS. 10A, 10B and 10C.

FIG. 11 is a block diagram of a message sequence scenario 1100 illustrating a first time registration of a mobile node with a foreign agent selected by a control node to provide network services to the mobile node. The block diagram includes the mobile node 210, the radio network node 216, the FACN 220, the PDSN 232, the HA 24 and the AAA server 240, as illustrated in FIG. 2. The exemplary message sequence scenario of FIG. 11 shows an embodiment in which the mobile node 210 establishes a PPP communication link with the PDSN 232. When the FACN 220 selects the PDSN 232 to service the mobile node 210, the mobile node 210 negotiates a PPP communication link with the PDSN 232 and initiates an agent discovery process, as illustrated at 1104 and 1106, respectively. Upon establishing the PPP communication link, the mobile node 210 sends a registration request message 1108 to the PDSN 232. According to a preferred embodiment, the registration request (lifetime) message 1108 may have a message format described in accordance with RFC 2002. However, different or equivalent message formats may alternatively be used.

When the PDSN 232 receives the registration request message 1108 and the PDSN 232 does not have the mobile node in its local visitor list, the PDSN 232 sends a visitor registration request message 1110 to the FACN 220 to determine whether the FACN 220 has authentication data of the mobile node. In one embodiment, the registration request message 1110 includes a number of extension fields defining, for example, session specific parameters, mobile node NAI parameters and authentication parameters. The session specific extensions include information related to the communication session between the mobile node 210 and the PDSN 232, the mobile node NAI extensions include information related to the user profile that is used between the mobile node 210 and the PDSN 232, and the authentication extensions include an authenticator value that may be computed on the PDSN 232 using a PDSN-FACN secret key. It should be understood that more, fewer, or equivalent extension fields may alternatively be used.

When the FACN 220 receives the registration request message 1110, the FACN 220 determines whether it has authentication data for the mobile node 210. According to the embodiment illustrated in FIG. 11, the FACN 220, as illustrated at block 1112, has no previous authentication status associated with the mobile node 210. Since the FACN 220 does not have the authentication data of the mobile node 210, the FACN 220 rejects the visitor list registration request and sends a visitor list registration reject reply message 1114 to the PDSN 232. The visitor list registration reject reply message 1114 may include a number of parameters informing the PDSN 232 about the status of its request. For example, if the authentication data of the mobile node 210 is available on the FACN 220, a visitor list registration reply message may include an authentication data available parameter, and, if the authentication data request is denied on the FACN 220, the visitor list registration reply message may include a reason for not providing the authentication data to the PDSN 232. For example, the FACN 220 may specify a failure of the foreign agent authentication process parameter, a registration identification mismatch parameter, a poorly formed request parameter, or an authentication data not available parameter.

When the PDSN 232 receives the visitor list registration reject reply message 1114, the PDSN 232 queries the AAA network server 1102 for the required authentication data of the mobile node 210, as illustrated in 1116. Once the mobile node 210 is authenticated, the PDSN 232 registers with the home agent 24. In one embodiment, the registration process with the home agent 24 includes sending a registration request message 1118 from the PDSN 232 to the home agent 24 and receiving a registration reply accept message 1120 at the PDSN 232 from the home agent 24. Upon a successful registration with the home agent 24, the PDSN 232 sends a registration reply accept message 1122 to the mobile node 210, thus, completing the registration process for the mobile node 210.

According to one embodiment, once the mobile node 210 is authenticated and registered with the home agent 24, the PDSN 232 informs the FACN 220 of the visitor list update. To do that, the PDSN 232 sends a visitor list registration update message 1124, preferably including the AAA profile that was determined by the PDSN 232 using the AAA server 1102. In addition to the extension fields discussed in reference to the visitor list registration request message 1110, the visitor list registration update message 1124 has a number of extension fields including the AAA profile of the mobile node 210. In one embodiment, the extension fields may be two octets long.

When the FACN 220 receives the visitor list registration update message 1122 from the PDSN 232, the FACN 220 updates the mobile user record of the mobile node 210. Further, in response to receiving the message 1122, the FACN 220 sends to the PDSN 232 a visitor list registration acknowledgement message 1126, thus, terminating the message sequence scenario illustrated in FIG. 11. Upon a successful registration of the mobile node 210, the mobile node 210 may start communicating data with a remote entity, as illustrated by a bi-directional packet data call-up block 1128.

The message sequence 1100 described in reference to FIG. 11 relates to the mobile IP first time registration process. However, the preferred embodiments are not limited to mobile IP, and are equally applicable when the mobile node 210 establishes simple IP sessions. FIG. 12 is a block diagram of a message sequence scenario 1200 illustrating a first time simple IP registration with a foreign agent that is selected by a control node. The block diagram includes the mobile node 210, the radio network node 216, the FACN 220, the PDSN 232, and the AAA server 240, as illustrated in FIG. 2. When the FACN 220 selects the PDSN 232 to service the mobile node 210, and the radio network node 216 registers with the PDSN 232, as described with reference to FIG. 9, the mobile node 210 establishes a communication link with the PDSN 232. According to the embodiment illustrated in FIG. 12, the mobile node 210 establishes a communication link with the PDSN 232 using a Link Control Protocol ("LCP") negotiation method 1204. Further, the mobile node 210 may send an access request message, such as a Password Authentication Protocol ("PAP")/Challenge Handshake Authentication Protocol ("CHAP") request message 1206 to the PDSN 232. The PAP/CHAP request message 1206 includes a registration request and information data associated with the mobile node 210. When the PDSN 232 receives the PAP/CHAP request message 1206 and does not have the mobile node 210 in its local visitor list, the PDSN 220 sends a visitor list registration request message 1208 to the FACN 232 to determine whether the FACN 232 has authentication data of the mobile node 210. The visitor list registration request message 1208 preferably includes a number of extension fields including session specific parameters, mobile node NAI parameters and authentication parameters of the PDSN 232.

When the FACN 220 receives the visitor list registration request message 1208, the FACN 220 determines whether it has stored authentication data for the mobile node 220. According to the embodiment illustrated in FIG. 12 at block 1210, the FACN 220 has no authentication data associated with the mobile node 210 in this example. Because, the FACN 210 has no previous authentication data of the PDSN 232, the FACN 210 rejects the visitor list registration request and sends a visitor list registration reject reply message 1212 to the PDSN 232. In a manner similar to the visitor list registration reject reply message 1114 in FIG. 11, the visitor list registration reject reply message 1212 may include a rejection reason parameter, such as an authentication data unavailable parameter. When the PDSN 232 receives the visitor list registration reject reply message 1212 from the FACN 220, the PDSN 232 queries the AAA server 1102 for the authentication data of the mobile node 210, as illustrated at the block 1214. Once the PDSN 232 receives the authentication data of the mobile node 210 from the AAA server 1102, the PDSN 232 may initiate PAP/CHAP negotiations 1216 with the mobile node 210 to establish a communication link between the mobile node 210 and the PDSN 232.

According to one embodiment, when the PDSN 232 authenticates the mobile node 210, the PDSN 232 transmits the authentication data of the mobile node 210 to the FACN 210 so that the FACN 210 can either update an existing mobile user record of the mobile node 210 with the authentication data received from the PDSN 232, or it can create a new mobile user record for the mobile node 210. In the embodiment illustrated in FIG. 12, the PDSN 232 sends a visitor list registration update message 1218 including the authentication data of the mobile node 210 to the FACN 220. When the FACN 220 receives the authentication data of the mobile node 210 and caches the received data into the user information record of the mobile node 210, the FACN 220 send a visitor list registration acknowledgement message 1220 to the PDSN 232, thus terminating the message sequence scenario illustrated in FIG. 12. Upon a successful registration of the mobile node 210 with the PDSN 232, the mobile node 210 may start communicating data over the IP communication link.

Figure 13:
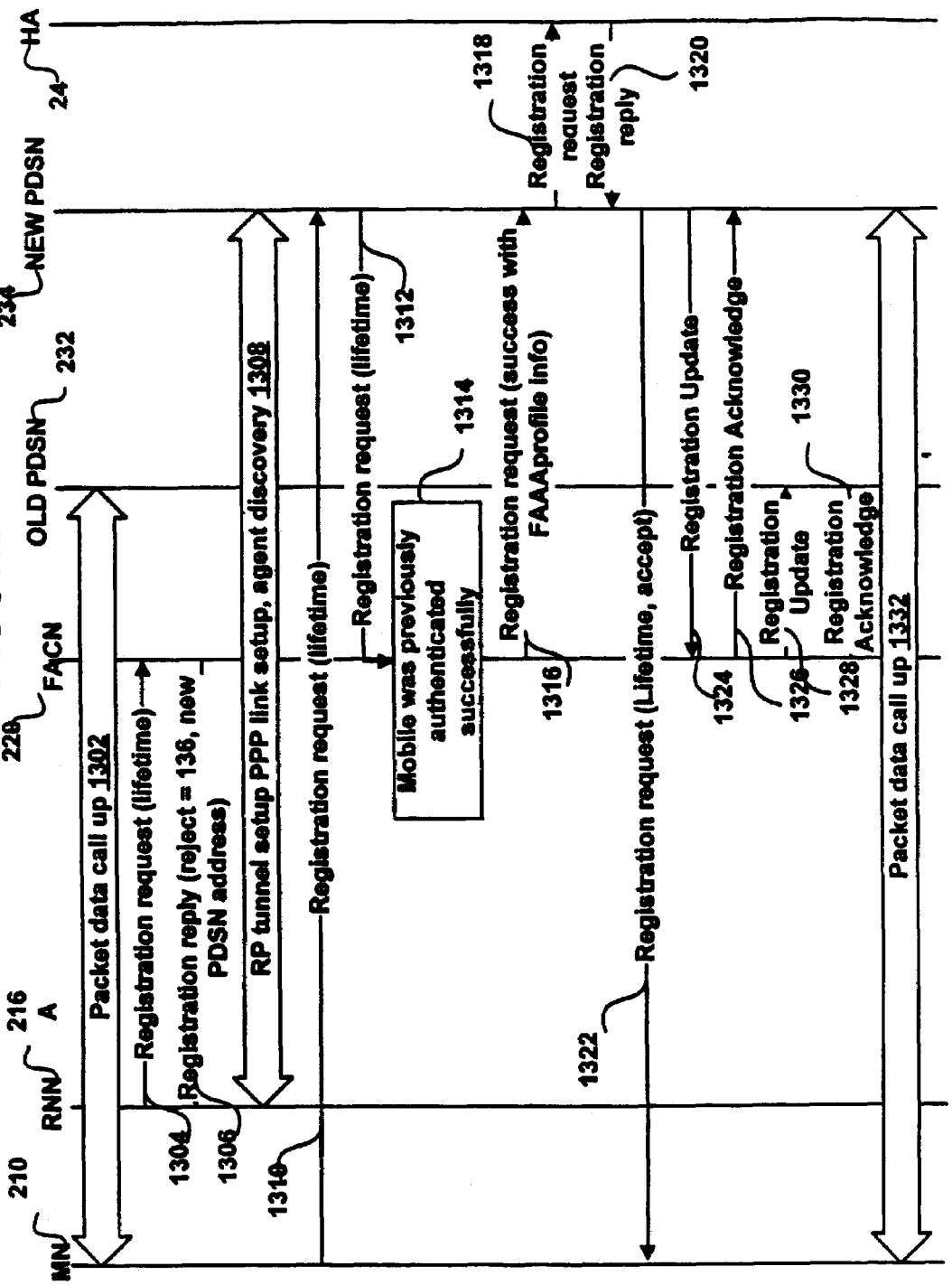
FIG. 13 is a message sequence scenario illustrating a mobile node handoff between foreign agents.

In the situations where the mobile node 210 roams to a new radio network node that does not include the last serving PDSN within the PDSN groups defined for the new radio network node, then, the FACN 220 selects a new PDSN to service the mobile node 210. This scenario causes a communication session, such as a mobile IP communication session or an IP communication session, to be handed off to a PDSN that is not currently providing services to the mobile node 210. This scenario is referred to as a "PDSN handoff". The FACN 210 may support PDSN handoffs via a set of update messages that may be exchanged between the PDNSs and the FACN 210. FIG. 13 is a block diagram of a message sequence scenario 1300 illustrating a PDSN handoff according to one embodiment. The block diagram includes the mobile node 210, the radio network node 216A, the FACN 220, an old PDSN such as the PDSN 232, a new PDSN such as the PDSN 234, and the home agent 24 of the mobile node 210. Prior to roaming to the service area of the radio network node 216A, the PDSN 232 provides network services to the mobile node 210, as illustrated at block 1302. When the mobile node 210 roams to a new service area of the radio network node 216A, the radio network node 216A sends a registration request message 1304 to the FACN 220 in order to determine a foreign agent that may provide communication services to the mobile node 210. The registration request message 1304 may include a number of parameters associated with the mobile node 210, such as session specific parameters and identification data for the mobile node 210. According to the embodiment illustrated in FIG. 13, the PDSN 232 is not included in any of the PDSN groups associated with the radio network node 216A, so that when the FACN 220 receives the registration request message 1304, the FACN 220 selects a new PDSN, the PDSN 234, to provide services to the mobile node 210. Upon selecting the PDSN 234 for the mobile node 210, the FACN 220 sends a registration reply message 1306 including a registration rejection parameter (since the FACN 220 rejects providing registration services to the mobile node 210), and, further, includes a network address of the PDSN 234.

When the radio network node 216A receives the registration reply message 1306 from the FACN with the address of the PDSN 234, the radio network node 216A establishes a communication link such as an RP tunnel on a PPP communication link to the PDSN 234, as illustrated at block 1308. Next, the mobile node 210 sends a registration request message 1310 to the new PDSN 234 selected on the FACN 220. Since the mobile node 210 has been handed off to the new PDSN 234, the PDSN 234 does not have the mobile session information associated with the mobile node 210 in its local visitor list. Thus, since the new PDSN 234 does not have authentication data of the mobile node 210, the new PDSN 234 sends a visitor list registration request message 1312 to the FACN 220 to determine if the FACN 220 has the authentication data of the mobile node 210. According to the embodiment illustrated in FIG. 13, the mobile node 210 roams to the service area of the radio network node 216A from a service area of another radio network node, and thus, the mobile node 210 was previously successfully authenticated and the FACN 220 has the authentication data of the mobile node 210 from a previous registration, as illustrated at block 1314. Further, if the FACN 220 determines that the mobile node is active, the FACN 220 returns the authentication data of the mobile node 210 in a visitor list registration reply message 1316. In one embodiment, the visitor list registration reply message 1316 has a number of extension fields including the authentication data of the mobile node 210.

When the FACN 220 provides the authentication data to the new PDSN 234, the new PDSN 234 may skip AAA process and may directly register with the home agent 24. Therefore, when the new PDSN 234 receives the authentication data in the visitor list registration reply message 1316, the new PDSN 234 communicates with the home agent 24 for mobile IP re-registration request processing. The re-registration process between the new PDSN 234 and the home agent 24 may include sending a registration request message 1318 to the home agent 24, and receiving a registration reply accept message 1320 from the home agent 24 upon completing the registration process.

When the new PDSN 234 successfully registers with the home agent 24, the new PDSN 234 sends a registration reply message 1322 to the mobile node 210 indicating a completion of the registration process. Additionally, according to one embodiment of the present invention, the new PDSN 234 may send a registration update message 1324 to the FACN 220. However, since the new PDSN 234 did not use an AAA server to authenticate the mobile node 210, and instead received the authentication data of the mobile node 210 from the FACN 210, the registration update message 1324 generated on the new PDSN 234 does may not include the authentication data received from the FACN 220. In one embodiment, if the new PDSN 234 sends the registration update message 1324 to the FACN 220, the registration update message 1324 may include a number of extension fields including session specific extensions, mobile node NAI extensions, and foreign agent-home agent authentication extensions.

When the FACN 220 receives the registration update message 1324 without the authentication data of the mobile node 210, the FACN 220 does not update its stored authentication profile for the mobile node 210. Instead, the FACN 220 marks the communication session specified in the message as an active session and sends a registration acknowledgement message 1326 to the FACN 220. Further, according to an exemplary embodiment, the FACN 220 uses the mobile user record associated with the mobile node 210 to determine if the previous mobile session status has been active prior to the roaming and, whether an IP address of the last visited PDSN in the entry is different from the one specified in the registration update message 1324. According to the embodiment illustrated in FIG. 13, the mobile node 210 is handed off to the new PDSN 234, and, thus, an IP address of the new PDSN 234 is different from the IP address of the last serving PDSN (the old PDSN 232). In such an embodiment, the FACN 220 sends to the last serving PDSN 232 a registration update message 1328 including an extension indicating that the mobile session of the mobile node 210 is no longer active. When the old PDSN 232 receives the registration update message 1328 from the FACN 220, the PDSN 232 may clear up the RP tunnel for the mobile session specified in the registration update message 1328 without waiting for the lifetime timer associated with the session to expire. When the old PDSN 232 receives the registration update message 1328, the old PDSN 232 sends to the FACN 220 a registration acknowledge message 1330 to indicate that the communication session has been deactivated. Upon a successful re-registration of the PDSN 234 with the home agent 24, the mobile node 210 may continue communicating data using the new PDSN 234 as a foreign agent, as illustrated at block 1330.

Assigning a PDSN by Service Request Parameter

The selection of a packet data serving node (PDSN) to serve a mobile node may be made based on one or more service request parameters associated with the mobile node. In that case, the service request parameter may be used by a control node, packet control function (PCF), or other network node to select a PDSN that offers a service associated with the service request parameters. As one example, a particular PDSN may have an address pool of static IP addresses. When a mobile node seeks a connection with a PDSN, the control node may determine whether the mobile node is assigned a static IP address, and, if so, assigns the mobile node to the PDSN that offers the static IP address assigned to the mobile node. The control node may have access to a database associating a service request parameter, such as an international mobile subscribe identifier (IMSI) for each mobile node, with PDSN addresses. When the mobile node requests a connection to a PDSN, the control node determines whether the IMSI of the mobile node is associated in the database with a PDSN address and, if so, assigns the mobile node to the associated PDSN. Once the mobile node establishes a connection with the PDSN, the PDSN can offer to the mobile node a network connection in which the mobile node is provided with its static IP address.

While the IMSI is one service request parameter available for reference in the selection of a PDSN, other service request parameters may be employed alternatively, or in addition to the IMSI. For example, in the setup of a connection between a radio network node or packet control function on the one hand and a control node, FACN, or PDSN on the other hand, airlink record data is shared, such as data in the R-P Connection Setup airlink records (Table 11, below) and Active Start airlink records (Table 12, below) described in the Telecommunications Industry Association interim standard "CDMA2000 Wireless IP Network Standard" TIA.IS-835-B (September 2002), incorporated herein by reference. Where a parameter in the R-P Connection Setup airlink records and/or the Active Start airlink records is used to identify a service offered by one or more PDSNs, the parameter is a service request parameter.

TABLE 12

R-P Connection Setup Airlink Fields

| ITEM | PARAMETER | MAX PAYLOAD LENGTH (octets) | FORMAT |
|---|---|---|---|
| y1 | Airlink Record Type = 1 | 4 | integer |
| y2 | R-P Connection ID | 4 | integer |
| y3 | Airlink Sequence Number | 4 | integer |
| a1 | MSID | 15 | string |
| a2 | ESN | 15 | string |
| d3 | Serving PCF | 4 | ip-addr |
| d4 | BSID | 12 | string |

TABLE 13

Active Start Airlink Fields

| ITEM | PARAMETER | MAX PAYLOAD LENGTH (octets) | FORMAT |
|---|---|---|---|
| y1 | Airlink Record Type = 1 | 4 | integer |
| y2 | R-P Connection ID | 4 | integer |
| y3 | Airlink Sequence Number | 4 | integer |
| e1 | User Zone | 4 | integer |
| f1 | Forward MUX Option | 4 | integer |
| f2 | Reverse MUX Option | 4 | integer |
| f5 | Service Option | 4 | integer |
| f6 | Forward Traffic Type (Primary, Secondary) | 4 | integer |
| f7 | Reverse Traffic Type (Primary, Secondary) | 4 | integer |
| f8 | Fundamental Frame Size (0/5/20 ms) | 4 | integer |
| f9 | Forward Fundamental RC | 4 | integer |
| f10 | Reverse Fundamental RC | 4 | integer |
| f14 | DCCH Frame Size (0/5/20 ms) | 4 | integer |
| i4 | Airlink Priority | 4 | integer |

In one example, different PDSNs may offer services for customers who subscribe to different companies. In that case, when a mobile unit of a customer seeks a connection to a PDSN, the ESN (electronic serial number), IMSI, and/or other mobile station identifier may be used as a service request parameter to determine which PDSN and/or PDSNs are operated by the company to which the customer subscribes. The mobile unit is then directed to establish a connection with a PDSN that provides services to customers of that company. In another example, the Service Option value (Table 13) is used to identify a particular type of link-layer connection, such as CDMA 2000 (1xRTT, or 3G1x), 1xEV, or 1xEV-DO. In that case, the Service Option value is used as a service request parameter to specify one or more PDSNs that offer the requested type of connection. Examples of other fields that can be used as service request parameters are an IP address of the packet control function, a base station identifier, or a user zone identifier.

In a system making use of a control node such as a FACN, the control node may have access to a database of PDSN addresses associated with service request parameters and may direct the connection of the mobile node to an appropriate FACN. Alternatively, the selection of a PDSN using a service request parameter may be made by a radio network node or packet control function without reference to a control node.

Figure 14:
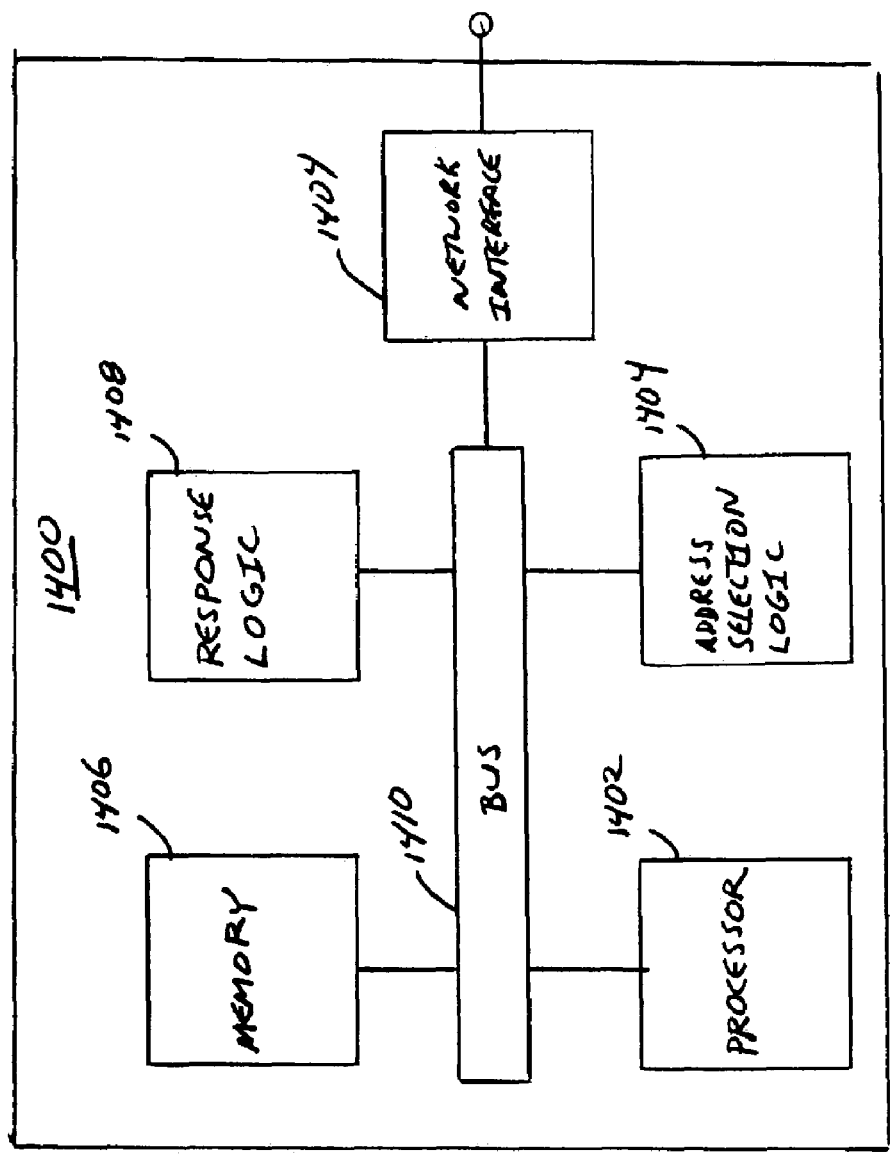
FIG. 14 is a schematic block diagram of a system for selecting a PDSN.

As illustrated in FIG. 14, a system that selects a PDSN based on a service request parameter may make use of a network node 1400 that includes a processor 1402 and a network interface 1404. The network node 1400 may be, for example, a radio network node, a PCF, or a FACN. The network interface 1404 is operative to receive messages associated with a mobile node seeking a network connection. One type of message received at the network interface 1404 may be an A11 Registration Request message. A10 and A11 interfaces are described in the TIA/EIA interim standard "Interoperability Specification (IOS) for CDMA 2000 Access Network Interfaces," TIA/EIA/IS-2001.7-B (May 2002), incorporated herein by reference. The message received at the network node 1400 includes a service request parameter, such as one or more of the parameters identified in Tables 12 and 13, above. Address selection logic 1404 in the network node uses the one or more service request parameters to identify one or more addresses of PDSNs that provide services associated with the service request parameters. The addresses of PDSNs offering services associated with one or more service request parameters may be stored in a computer memory 1406, which may include a database with PDSN addresses indexed by service request parameter. In one embodiment, a database in the computer memory 1406 may associate A10/A11 addresses of PDSNs with the INMSI of the mobile node, as illustrated schematically in Table 14. The address selection logic 1404 may be operative to consult the computer memory 1406 to select a PDSN address. The address selection logic 1404 and response logic 1408 may be implemented by software executed by a processor 1402. Moreover, the components of the network node 1400 may communicate over a bus 1410.

TABLE 14

| IMSI | PDSN A10/A11 ADDRESS |
|---|---|
| 7682469136 | a.b.c.d |
| 9134286128 | e.f.g.h |
| ... | ... |
| 7186396238 | w.x.y.z |

In one embodiment in which the network node 1400 is a control node, the network node may receive a Registration Request message from a packet control function or radio network node requesting an R-P connection with a PDSN. Such a message may be in the form of an A11 registration request message. In that case, the network node 1400 identifies at least one service request parameter in the message and uses the parameter to select a PDSN, for example by consulting data in the computer memory 1406 to select a PDSN address associated with the service request parameter. The network node 1400 is provided with response logic 1408 to generate a response message that includes the selected PDSN address, and the response message is then sent by the network interface 1404. The response message may be an A11 Registration Reply message that includes the result code 'H88', together with the selected PDSN address as the alternate proposed PDSN address. The result code 'H88' is interpreted by the recipient as a Registration Denied response, the PCF receiving the reply message then attempts to establish an R-P connection with the selected PDSN at the selected PDSN address, for example by sending an A11 registration request to the selected PDSN.

In one embodiment in which the network node 1400 is a PCF or a radio network node, the network node receives a message from the mobile node including a service request parameter. In that case, the address selection logic 1404 may be operative to select a PDSN by identifying a PDSN associated with the service request parameter in the computer memory 1406 or it may retrieve the selected PDSN address by consulting a different network node such as a FACN. The network node 1400 may consult a FACN by, for example, sending an A11 registration request message to the FACN including the service request parameter and receiving an A11 registration response that includes the address of the PDSN. Once the network node 1400 has identified the address of a selected PDSN, the response logic 1408 of may then be operative to send a message requesting an R-P connection to the PDSN.

The address selection logic 1404 may identify more than one matching PDSN that offers a service associated with the received service request parameters. In that event, the address selection logic 1404 may use a load balancing algorithm or other technique, such as those described above, to select the PDSN address from a group of PDSN addresses.

One exemplary method for selecting a PDSN is illustrated in FIG. 15a, in which the network node is a control node. The node receives at step 1500 a message associated with a mobile node, such as a registration request message, from a radio network node or a PCF, including a service request parameter. At step 1502, the node uses the service request parameter to select the address of a PDSN that offers a service associated with the service request parameter. At step 1504, the node responds with a message that directs the PCF to connect with the selected PDSN. The response may be a registration reject message that includes the address of the selected PDSN. The PCF may then send a registration request message to the selected PDSN, which the PDSN receives at step 1506. The selected PDSN may then, at step 1508, establish an R-P connection with the PCF and subsequently, at step 1510, establish a PPP session with the mobile node. The establishment of a PPP session with the mobile node may entail the use of the Challenge Handshake Authentication Protocol ("CHAP"), as described above, and/or the use of the Internet Protocol Control Protocol, as described in RFC-1332, "The PPP Internet Protocol Control Protocol (IPCP)" (May 1992).

Another exemplary method for selecting a PDSN is illustrated in FIG. 15b, in which the network node is a PCF. At step 1512, the PCF receives a message from a mobile node requesting a communications link. The message includes a service request parameter which the node uses to select a PDSN at step 1514, by consulting a database of PDSN addresses associated with the service request parameter, by retrieving a PDSN address from a FACN, or otherwise. At step 1516, the node directs a connection with the selected PDSN by, for example, sending an A11 registration request to the PDSN. As in steps 1506, 1508, and 1510 of FIG. 15a, the PDSN receives the registration request message at step 1518, establishes an R-P connection with the PCF at step 1520, establishes a PPP session with the mobile node at step 1522.

In establishing a PPP connection with the mobile node in step 1510 (FIG. 15a) or 1522 (FIG. 15b), the PDSN may consult an AAA (such as an FAAA) and/or RADIUS server, as described above. In an embodiment where the service associated with the PDSN is providing a static IP address to the mobile node, the PDSN may obtain the static IP address and other user profile information from an FAAA server. The FAAA server may determine the correct static IP address by, for example, locating a user profile database entry indexed by a mobile station identifier such as the mobile node's IMSI or NAI. Once a PPP session has been established, the mobile node has access to a communication network in which the mobile node is addressed by its static IP address.

It should be noted that the user profile database need not be indexed by the service request parameter. For example, where the IMSI is a service request parameter associated with a static IP address, the method includes the selection of the PDSN by reference to the IMSI; however, once the PDSN is selected, the static IP address may be assigned based on a different identifying parameter, such as the NAI.

In some instances, the network node may not be able to locate any available PDSN that provides services associated with the service request parameter. In that case, the network node may deny access to the mobile node or it may direct a connection to an alternate PDSN.

It should be understood that the programs, processes, methods and systems described herein are not related or limited to any particular type of computer or network system (hardware or software), unless indicated otherwise. Various types of general purpose or specialized computer systems supporting the IP networking may be used with or perform operations in accordance with the teachings described herein.

In view of the wide variety of embodiments to which the principles of the present invention can be applied, it should be understood that the illustrated embodiments are examples only, and should not be taken as limiting the scope of the present invention. For example, the steps of the flow diagrams may be taken in sequences other than those described, more or fewer steps may be used, and more or fewer elements may be used in the block diagrams. While various elements of the preferred embodiments have been described as being implemented in software, in other embodiments in hardware or firmware implementations may alternatively be used, and vice-versa. The claims should not be read as limited to the described order or elements unless stated to that effect. Therefore, all embodiments that come within the scope and spirit of the following claims and equivalents thereto are claimed as the invention.

What is claimed:

1. A method of selecting a PDSN (Packet Data Serving Node) for a mobile station, wherein the mobile station has a communication link with a PCF (Packet Control Function), the method comprising:
    sending an A11 registration request message from the PCF to a control node, wherein the A11 registration request message includes an identifier of the mobile station;
    receiving the A11 registration request message at the control node and, in response, based on the identifier of the mobile station, selecting a PDSN that offers a static IP service for the mobile station;
    sending an A11 registration denial message from the control node to the PCF, wherein the registration denial message includes an address of the selected PDSN;
    receiving the A11 registration denial message at the PCF and, in response, establishing an R-P connection between the PCF and the selected PDSN;
    providing an NAI (Network Access Identifier) of the mobile station to the selected PDSN;
    based on the NAI, selecting a predetermined static IP address of the mobile station; and
    providing for the mobile station a network connection wherein the mobile station is addressed with a static IP address.

2. A method according to claim 1, wherein the registration denial message includes registration denial code 136.

3. A method according to claim 1, wherein the control node is a foreign agent control node.

4. A method of providing a static IP address for a mobile station having an IMSI (International Mobile Subscriber Identifier) and an NAI (Network Access Identifier), wherein the mobile station has a first communication link with a PCF (Packet Control Function), the method comprising:
    based on the IMSI of the mobile station, selecting a PDSN (Packet Data Serving Node) that offers a static IP service for the mobile station;
    after selecting the PDSN, establishing a second communication link between the mobile station and the selected PDSN, wherein establishing the second communication link includes providing the NAI of the mobile station to the PDSN;
    based on the NAI of the mobile station, identifying a predetermined static IP address of the mobile station; and
    providing for the mobile station a network connection wherein the mobile station is addressed with the predetermined static IP address.

5. A method according to claim 4, wherein establishing the second communications link includes establishing an R-P connection between the PCF and the selected PDSN.

6. A method according to claim 5, wherein establishing the second communication link includes establishing a PPP session between the mobile station and the PDSN.

7. A method according to claim 4, wherein establishing the second communication link includes establishing a PPP session between the mobile station and the PDSN.

8. A method according to claim 4, wherein the step of selecting a PDSN is performed by a foreign agent control node.

9. A method according to claim 4, further comprising, in response to the selection of a PDSN that offers a static IP service for the mobile station, sending a registration denial message to the radio node, wherein the registration denial message includes an address of the selected PDSN.

* * * * *